(12) United States Patent
Kawamura et al.

(10) Patent No.: US 6,931,658 B1
(45) Date of Patent: Aug. 16, 2005

(54) IMAGE ON-DEMAND TRANSMITTING DEVICE AND A METHOD THEREOF

(75) Inventors: Hirobumi Kawamura, Kawasaki (JP); Michiko Mizoguchi, Kawasaki (JP); Yuichi Terui, Kawasaki (JP); Yoshimasa Watanabe, Kawasaki (JP); Yuji Nagano, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

(21) Appl. No.: 09/630,984

(22) Filed: Aug. 2, 2000

(30) Foreign Application Priority Data

Oct. 26, 1999 (JP) ................................. 11-304698

(51) Int. Cl.⁷ ........................................... H04N 7/173
(52) U.S. Cl. ........................... 725/94; 386/83; 709/247
(58) Field of Search .... 725/87, 134, 94; 386/109–112, 386/46, 83; 709/247

(56) References Cited

U.S. PATENT DOCUMENTS

| | | | |
|---|---|---|---|
| 5,130,792 A * | 7/1992 | Tindell et al. ............... | 725/134 |
| 5,621,660 A * | 4/1997 | Chaddha et al. ............ | 709/247 |
| 6,396,507 B1 * | 5/2002 | Kaizuka et al. ............. | 345/661 |
| 6,430,354 B1 * | 8/2002 | Watanabe .................... | 386/46 |

FOREIGN PATENT DOCUMENTS

| | | |
|---|---|---|
| JP | 6-105296 | 4/1994 |
| JP | 7-264563 | 10/1995 |
| JP | 8-088617 | 4/1996 |
| JP | 10-013812 | 1/1998 |

* cited by examiner

*Primary Examiner*—Vincent Boccio
(74) *Attorney, Agent, or Firm*—Katten Muchin Zavis Rosenman

(57) ABSTRACT

An image, which is captured by a camera that a worker, etc., carries, is once stored in a ring buffer memory for storing image signals. The image is extracted from the ring buffer memory, and a quasi-moving image is generated. In a normal state, the quasi-moving image is displayed on a monitor of a center such as a control room, etc. via codecs on transmitting and receiving sides. When a user viewing the monitor makes a request to view a sharp image of a particular frame, or the high-quality motion of a subject while viewing the frames preceding or succeeding a particular frame, the image frame or frames are read from the buffer memory for storing image signals, and displayed on the monitor.

24 Claims, 22 Drawing Sheets

(Pos[0].x, Pos[0].y)

(Pos[1].x, Pos[1].y)

( HALFWAY OMITTED )

(Pos[n].x, Pos[n].y)

( HALFWAY OMITTED )

(Pos[N-1].x, Pos[N-1].y)

NOTE 1) #n-1, #n, #n+1, AND #n+2 ARE SERIAL Nos OF ENCODED AND TRANSMITTED FRAMES
NOTE 2) #n AND T(#n) ARE FRAME AND TIME IDENTIFIER
NOTE 3) Δt IS SAMPLING FREQUENCY. IN CASE OF NTSC STANDARD 1/29.97 Hz = APPROXIMATELY 33.37 msec
NOTE 4) SHADED FRAMES INDICATE THAT SUFFICIENT QUALITIES ARE NOT GIVEN DUE TO NARROW-BAND IMAGE TRANSMISSION NOTE 1) #n-1, #n, #n+1, AND #n+2 ARE SERIAL NOs OF ENCODED AND TRANSMITTED FRAMES
NOTE 2) #n AND T(#n) ARE FRAME AND TIME IDENTIFIERS
NOTE 3) Δt IS SAMPLING FREQUENCY. IN CASE OF NTSC STANDARD 1/29.97 Hz = APPROXIMATELY 33.37 msec
NOTE 4) SHADED FRAMES INDICATE THAT SUFFICIENT QUALITY IS NOT GIVEN DUE TO NARROW-BAND IMAGE TRANSMISSION

SCREEN OBTAINED BY REDUCING AND SYNTHESIZING 4 FRAMES

SCREEN OBTAINED BY REDUCING AND SYNTHESIZING 9 FRAMES

NOTE 1) #n-1, #n, #n+1, AND #n+2 ARE SERIAL NOs OF ENCODED AND TRANSMITTED FRAMES
NOTE 2) #n AND T(#n) ARE FRAME AND TIME IDENTIFIERS SPECIFIED BY RECEIVING SIDE
NOTE 3) $\Delta t$ IS SAMPLING FREQUENCY. IN CASE OF NTSC STANDARD 1/29.97 Hz = APPROXIMATELY 33.37 msec
NOTE 4) SHADED FRAMES INDICATE THAT SUFFICIENT QUALITY IS NOT GIVEN DUE TO NARROW-BAND IMAGE TRANSMISSION NOTE 1) #n-1, #n, #n+1, AND #n+2 ARE SERIAL NOs OF ENCODED AND TRANSMITTED FRAMES
NOTE 2) #n AND T(#n) ARE FRAME AND TIME IDENTIFIERS SPECIFIED BY RECEIVING SIDE
NOTE 3) Δt IS SAMPLING FREQUENCY. IN CASE OF NTSC STANDARD 1/29.97 Hz = APPROXIMATELY 33.37 msec
NOTE 4) SHADED FRAMES INDICATE THAT SUFFICIENT QUALITY IS NOT GIVEN DUE TO NARROW-BAND IMAGE TRANSMISSION

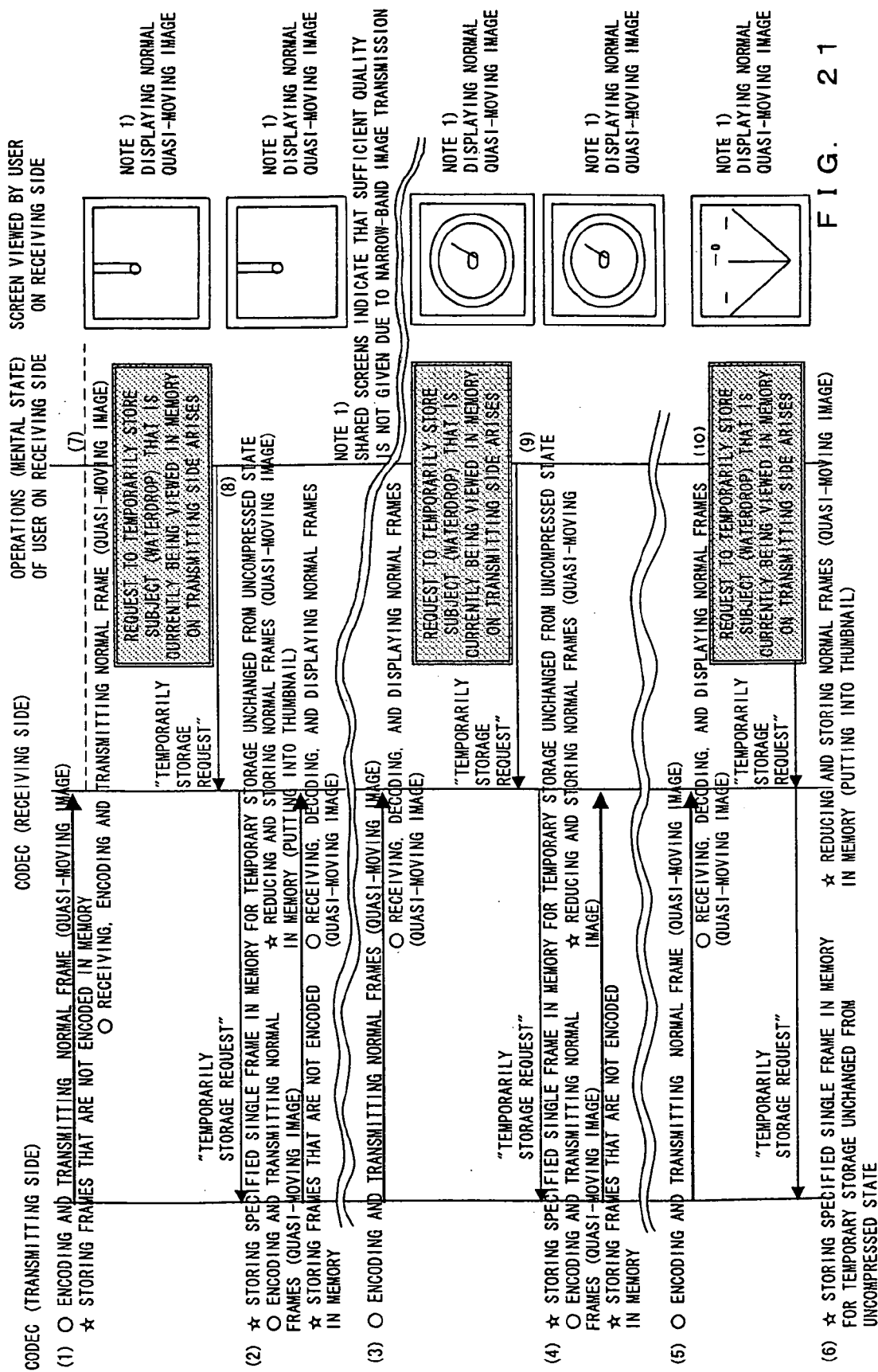

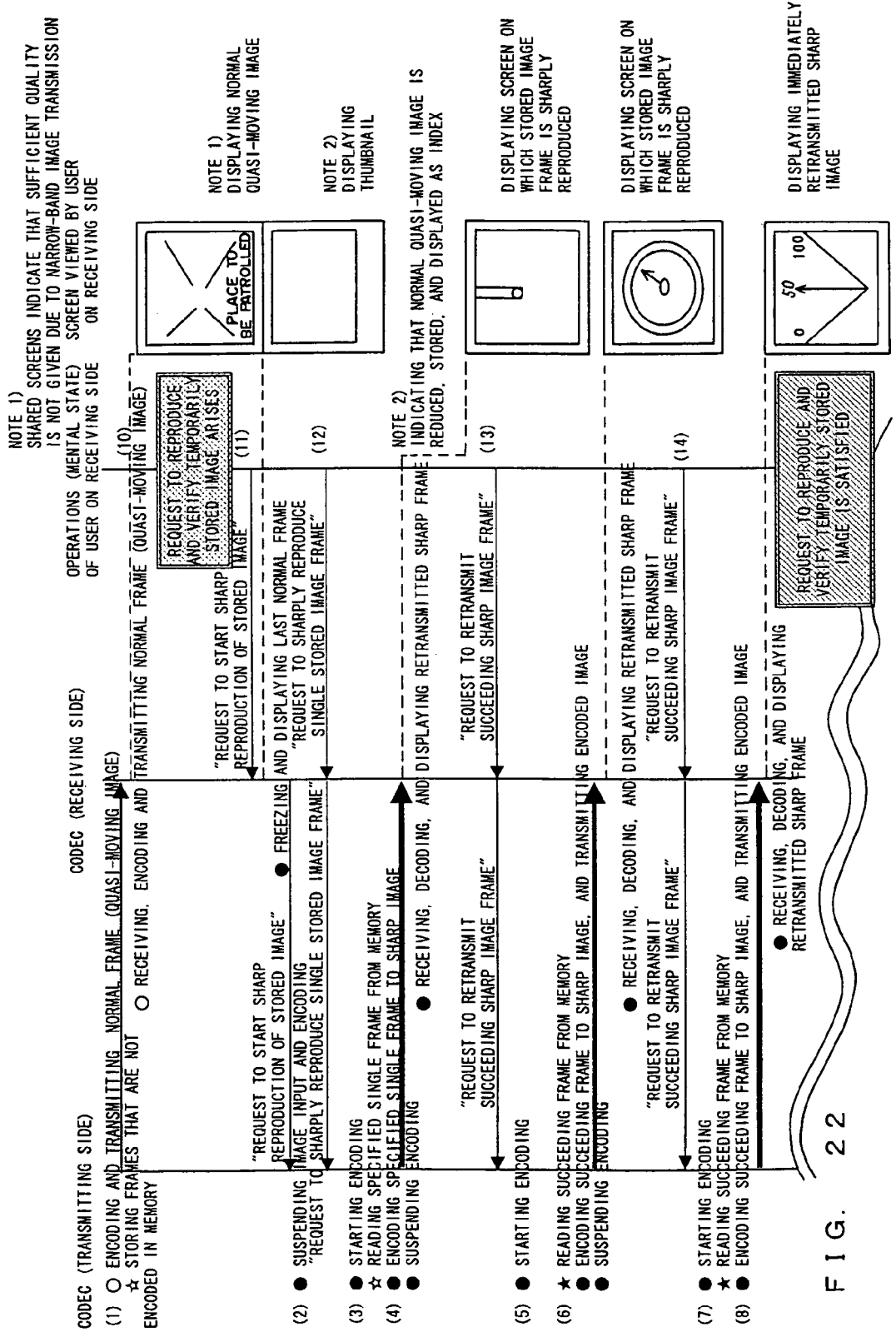

IMAGE ON-DEMAND TRANSMITTING DEVICE AND A METHOD THEREOF

BACKGROUND OF THE INVENTION

1. Field of the Invention

The present invention relates to an image on-demand transmitting device and a method thereof.

2. Description of the Related Art

Technique for Reducing the Size of an Image Encoding Device (Codec).

It has been a long time since image encoding (compression) algorithms for a videoconference and a videophone were produced. An image encoding device has been reduced in size and power consumption by using LSI technology and the market become mature. Image encoding devices are no longer stationary and large.

Mobile Communications Technique

A cellular phone and a PHS (Personal Handy phone System) exhibit explosive growth in their second generation (of a digital type) as a result of a reduction of device size and the strenuous efforts to improve the infrastructure made by carriers (companies providing communications services). On a worldwide scale, there is a move afoot in the third generation to standardize methods unique to respective countries and areas.

There is a demand for implementing an image transmitting system, which is carried by a person and implemented via a mobile communications infrastructure as shown in FIG. 1. For example and as is shown in FIG. 1, when a worker 201 goes to a work site carrying a small image transmitting device 200, inspects or repairs a leak in a meter or a valve, etc., and reports the state of construction, progress checking, operations, a disaster site, etc., he or she captures an image with his or her portable small image transmitting device, and transmits the captured image to a control room 202. At the control room 202, a system such that the state of progress checking of the operations, etc., is judged according to the image received from the worker 201, and a necessary instruction is given to the worker 201 by voice, may be considered. The communications system adopted by the worker 201 is a wireless communication. With current communications systems such as a cellular phone system, etc., it is impossible not only to transmit an image of sufficiently high quality at a high resolution, but also to secure a sufficient bandwidth when a communications line is used for the above described purpose also in W-CDMA, which is currently being developed for future implementation. As described above, a (on-demand) system with which the control room 202 can issue an instruction to the worker 201 in real time in response to a transmitted image is demanded. However, since a sufficient bandwidth cannot be secured, satisfactory operability cannot be implemented even with the communications systems provided by carriers.

Unlike a system of MPEG 2, etc., the infrastructure of narrow-band communications such as PHS and ISDN systems, etc., which are available at low cost, is dominant in the existing image transmitting systems such as a videoconference, videophone, a supervisory codec, etc. Currently, the following methods are dominant for encoding systems in a narrow-band.

(1) A method for encoding an image itself, which is captured by a camera (Motion JPEG, etc.).

(2) A method for encoding a difference from an immediately preceding captured image (H.261 and H.263).

With the method (1), each image is encoded, so that the amount of information to be transmitted becomes large and each image is displayed slowly. Hence, by reducing the amount of information of each image with the use of the continuity of a moving image, the method (2) is implemented.

In the existing image transmitting systems such as a videoconference, a videophone, a monitoring codec, etc., a camera is installed. Therefore, the angle of the camera is fixed or can be changed only in the horizontal and vertical directions. Accordingly, the background of an image captured by the camera is the same as that of an immediately preceding captured image, or the whole background is moved in the horizontal or vertical direction. As a result, encoding of the (motional) difference from the immediately preceding captured image allows the amount of information to be reduced in comparison with the encoding of the image itself, which is captured by the camera, whereby a transmission efficiency can be improved.

However, since the (motional) difference is encoded, the following problems may arise when a person carries or wears a camera, and uses it.

That is, because the (motional) difference from an immediately preceding captured image is detected in the horizontal and vertical directions, image motions other than those in the horizontal and vertical directions (by enlargement, camera rotation, etc.) cannot be supported. As a result, the entire background must be redrawn.

For this reason, the transmission efficiency is degraded, and a solution to the above described problems is demanded.

This specification refers to, as a narrow-band communications system, such a communications system which cannot secure a sufficient bandwidth for an image on-demand transmission. When an image on-demand transmission is performed with such a narrow-band communications system, a possible solution is such that low-resolution images are frequently transmitted, high-resolution images are transmitted at a low frame rate, intermediate-resolution images are transmitted at an intermediate frame rate, or these transmission methods are switched depending on need.

FIG. 3 exemplifies the configuration of a conventional image on-demand communications system using a narrow-band communications system.

Images captured by a camera 207 that the worker possesses are transmitted to a codec 205 on a transmitting side, which encodes the images. However, since a communications bandwidth is not sufficient, only the minimum of required data is stored in a buffer memory 209 for encoding by discarding most of the large amount of image information obtained with the camera 207. Then, the data is encoded and transmitted. A codec 206 on a receiving side stores the data transmitted from the codec 205 on the transmitting side in a buffer memory 210 for decoding. The data is decoded and displayed on a monitor 208 in a control room, etc. Accordingly, only images of low quality can be viewed in the control room, and at the same time, most of the large amount of image information captured by the camera 207 is discarded on the transmitting side, leading to inefficiency.

The mobile communications technology in the second generation cannot secure a broad transmission line bandwidth. A broadband will not necessarily be available at low-cost even in the third generation, because frequencies appear to be used up. Therefore, an image encoding (compression) algorithm must be used in a narrow-band, so that image encoding must be performed by giving precedence to a frame rate (motions) over an image quality, or vice versa, or by making a trade-off between them.

SUMMARY OF THE INVENTION

An object of the present invention is to provide an image on-demand transmitting device and a method thereof.

An image on-demand transmitting device according to the present invention is a device which performs an image transmission by an on-demand request from a receiving side. This device comprises: an image obtaining unit obtaining an image; a buffer memory unit temporarily storing the image obtained by the image obtaining unit; a quasi-moving image transmitting unit transmitting to a receiving side a quasi-moving image acquired by degrading the quality and the frame transmission rate of the image obtained by the image obtaining unit; and a transmitting unit performing a predetermined process for the image read from the buffer memory unit, and for transmitting the image to the receiving side.

An image on-demand transmitting device in another aspect of the present invention is a device which performs an image transmission by an on-demand request from a receiving side. This device comprises: an image obtaining unit obtaining an image; a first buffer memory for temporarily storing the image obtained by the image obtaining unit; a second buffer memory unit reading the image stored in the first buffer memory unit, and for storing the read image by a request from a receiving side; a quasi-moving image transmitting unit transmitting to a receiving side a quasi-moving image acquired by degrading the quality and the frame transmission rate of the image obtained by the image obtaining unit; and a controlling/transmitting unit performing a predetermined process for the image read from the second buffer memory unit by an on-demand request from the receiving side, and for transmitting the image to the receiving side by a request from the receiving side.

An image transmitting method according to the present invention is a method which performs an image transmission by an on-demand request from a receiving side. This method comprises the steps of: (a) obtaining an image; (b) temporarily storing the image obtained in the step (a); (c) transmitting to a receiving side a quasi-moving image acquired by degrading the quality and the frame transmission rate of the image obtained in the step (a); and (d) performing a predetermined process for the image stored in the step (b) and transmitting the image to the receiving side by an on-demand request from the receiving side.

An image transmitting method in another aspect of the present invention is a method which performs an image transmission by an on-demand request from a receiving side. This method comprises the steps of: (a) obtaining an image; (b) temporarily storing the image obtained in the step (a); (c) reading the image stored in the step (b), and storing the read image by a request from the receiving side; (d) transmitting to a receiving side a quasi-moving image acquired by degrading the quality and the frame transmission rate of the image obtained in the step (a); and (e) storing the image read in the step (b) in the step (c) by an on-demand request from the receiving side, and performing a predetermined process for the image read from the image stored in the step (c) and transmitting the image to the receiving side by a request from the receiving side.

According to the present invention, a quasi-moving image which is obtained by sampling image frames and whose sharpness is degraded is normally transmitted to a receiving side in a narrow-band communications system that cannot transmit to a receiving side a moving image which is obtained on a transmitting side and whose sharpness remains unchanged. The obtained moving image is temporarily stored in a buffer memory unit (such as a ring buffer) for a predetermined time period. When a request to view a sharp image is issued from the receiving side, the image stored in the ring buffer is encoded to an image with a high degree of sharpness, and transmitted to the receiving side. When a request to view the details motion of a subject is issued from the receiving side, image frames preceding and succeeding the image frame specified by the receiving side are read from the ring buffer, encoded to a sharp image, and transmitted to the receiving side. As described above, a receiving side can obtain a requested image by issuing an on-demand request to an image on-demand transmitting device on a transmitting side, if the receiving side desires to view the details of the motion of a subject while viewing a quasi-moving image.

Accordingly, an image transmission can be performed by using a narrow communications bandwidth while securing necessary information.

BRIEF DESCRIPTION OF THE DRAWINGS

FIG. 21 shows the sequence for requesting a transmitting side to temporarily store several scenes; and FIG. 22 shows the sequence for requesting sharp reproduction of a stored image at arbitrary timing, which relates to FIG. 21.

DESCRIPTION OF THE PREFERRED EMBODIMENTS

The present invention is intended to "retransmit an image frame while viewing the outline of a quasi-moving image after adaptively and variably encoding (compressing) the image frame by an on-demand request from a remote location in image transmitting systems that cannot secure a sufficient bandwidth.

Accordingly, in the present invention, as a solution to the above described problems, a ring buffer memory for storing image signals, which is used for temporary spooling, is arranged on a transmitting side, and all (or some) of image signals captured by a camera are temporarily spooled. Normally, an index-like quasi-moving image is transmitted. By an on-demand request, a normal quasi-moving image transmission is suspended, and a requested image frame is immediately retransmitted by being suitably encoded (compressed) to satisfy the request.

Viewing an index-like quasi-moving image with the degree of sharpness, which is as low as allowing a subject to be identified on a receiving side ((1) as if looking through a viewfinder), a subject or a scene is selected ((2) as if waiting for a photograph opportunity). The selected subject or scene is identified by the identifiers assigned to each frame of the above described quasi-moving image. In this sense, the above described quasi-moving image serves as an index for identifying a frame, and a quasi-moving image is referred to as an "index-like" image in this specification. By an on-demand request ((3) as if pressing a shutter release button), the image frame is retransmitted by being changed with a suitable image encoding (compression) method implementing a suitable resolution (a suitable degree of sharpness) or suitable motion (continuity) of an image frame.

Figure 1:
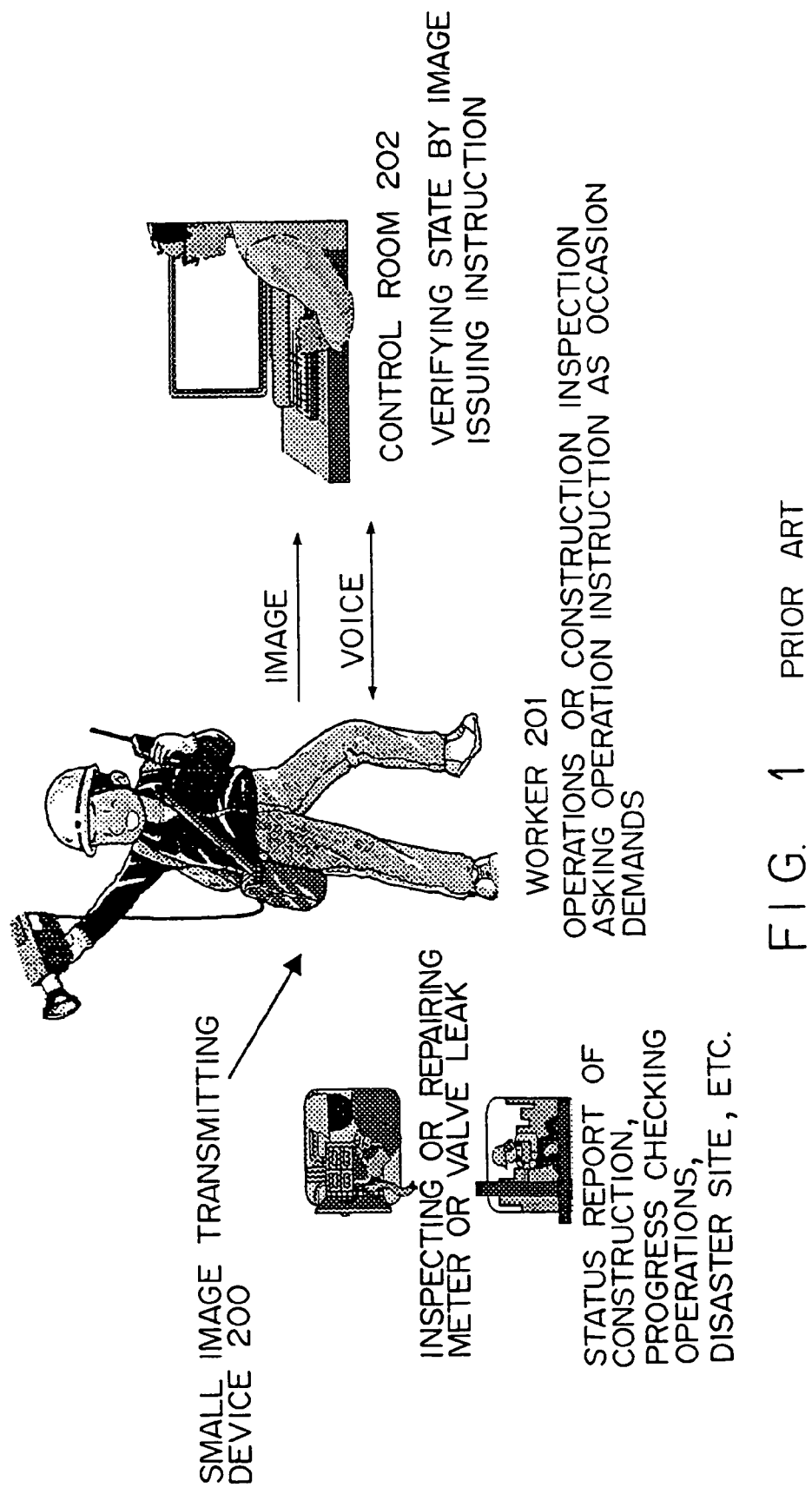
FIG. 1 explains an image on-demand transmitting system, which is carried by a person and implemented via a mobile communications infrastructure.
Figure 2:
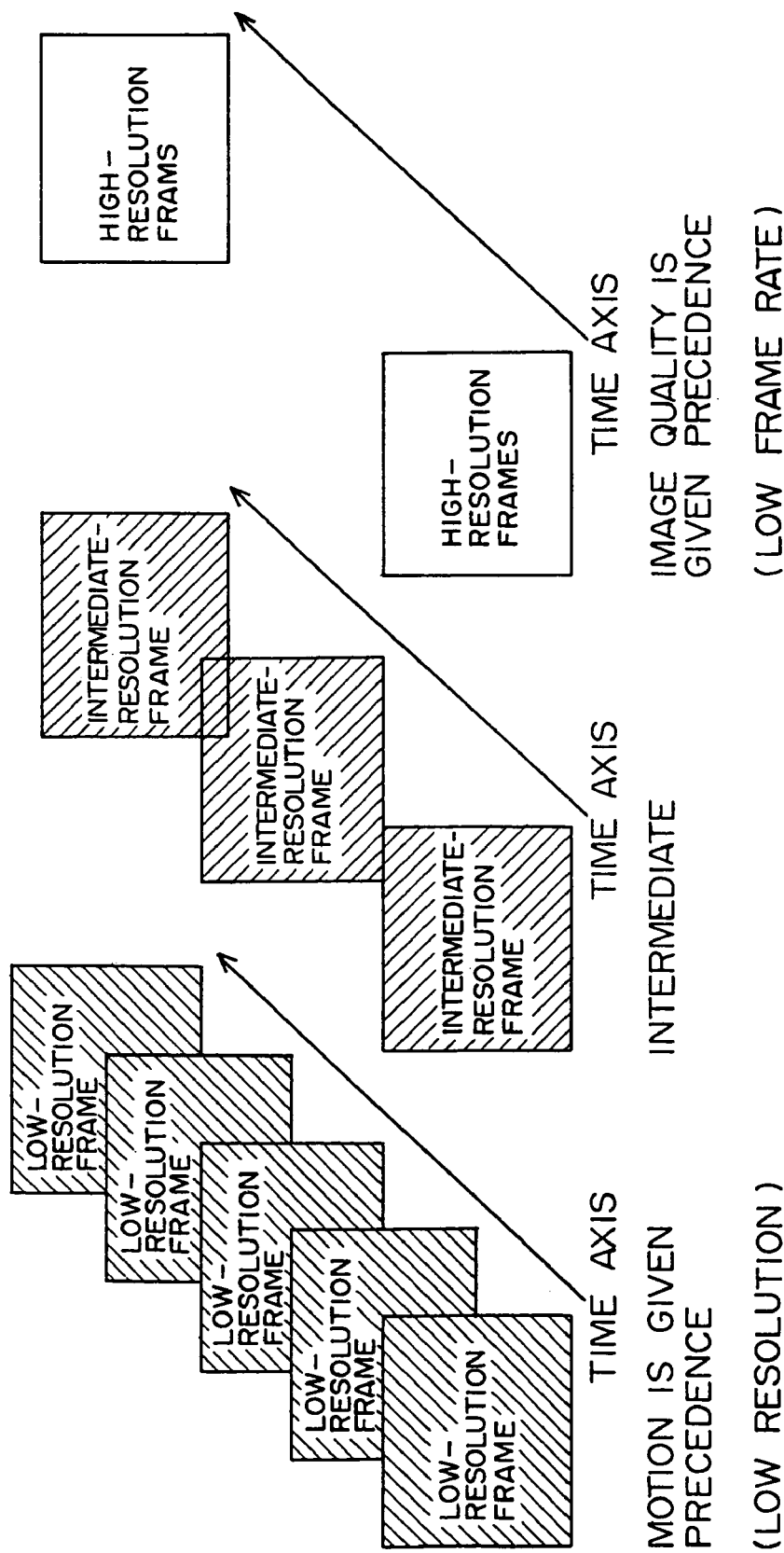
FIG. 2 explains an image on-demand transmitting method using a narrow-band communications line.
Figure 3:
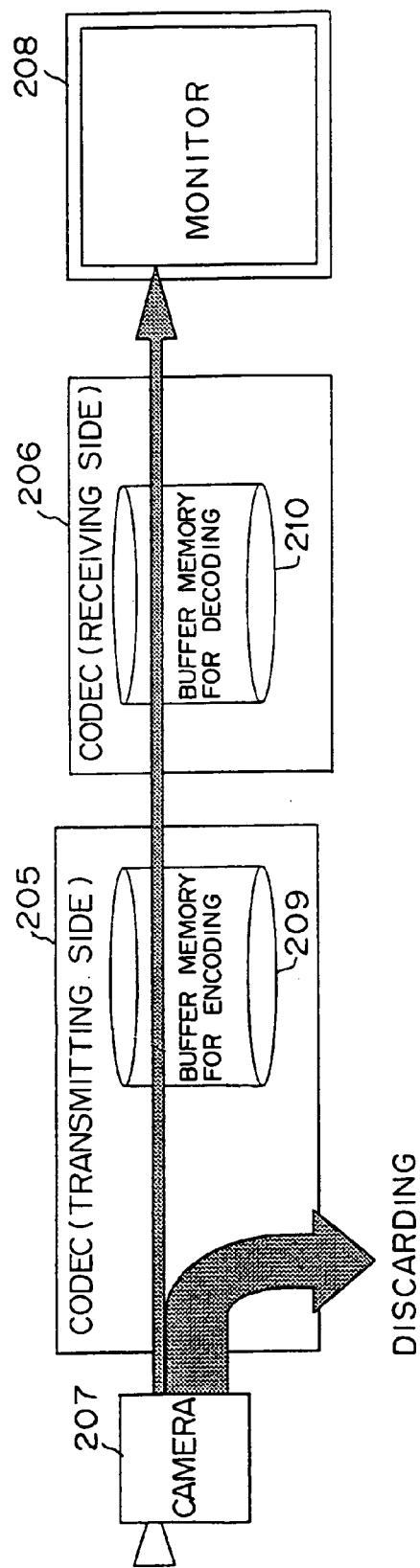
FIG. 3 exemplifies the configuration of a conventional image on-demand communications system using a narrow-band communications system.

A preferred embodiment according to the present invention assumes a system of FIG. 1, in which a worker carries a camera, etc., and the images captured by the camera are monitored in a control room. The worker performs operations carrying a camera or an image transmitting device. FIG. 1 shows the state where the images captured by the camera that the worker carries are encoded (compressed) by an image encoding/decoding device (codec), transmitted to the control room via a mobile communications infrastructure, decoded (decompressed) by an image encoding/decoding device (codec) in the control center, and output to a monitor. The control room side instructs or assists the worker by voice while viewing this display.

The distinguished feature of this image on-demand transmitting system is that a camera is not installed, and a worker carries a camera in hand (or wears a camera) and freely moves to change a subject variously, unlike in a conventional videoconference, videophone, or remote monitoring system. A requirement for the subject (or scene) varies widely, such as "a resolution (sharpness)", "motion (continuity)", or the like. Additionally, a person moves to change a subject (or a scene) in many cases, and a travel time arises at this time.

Figure 4:
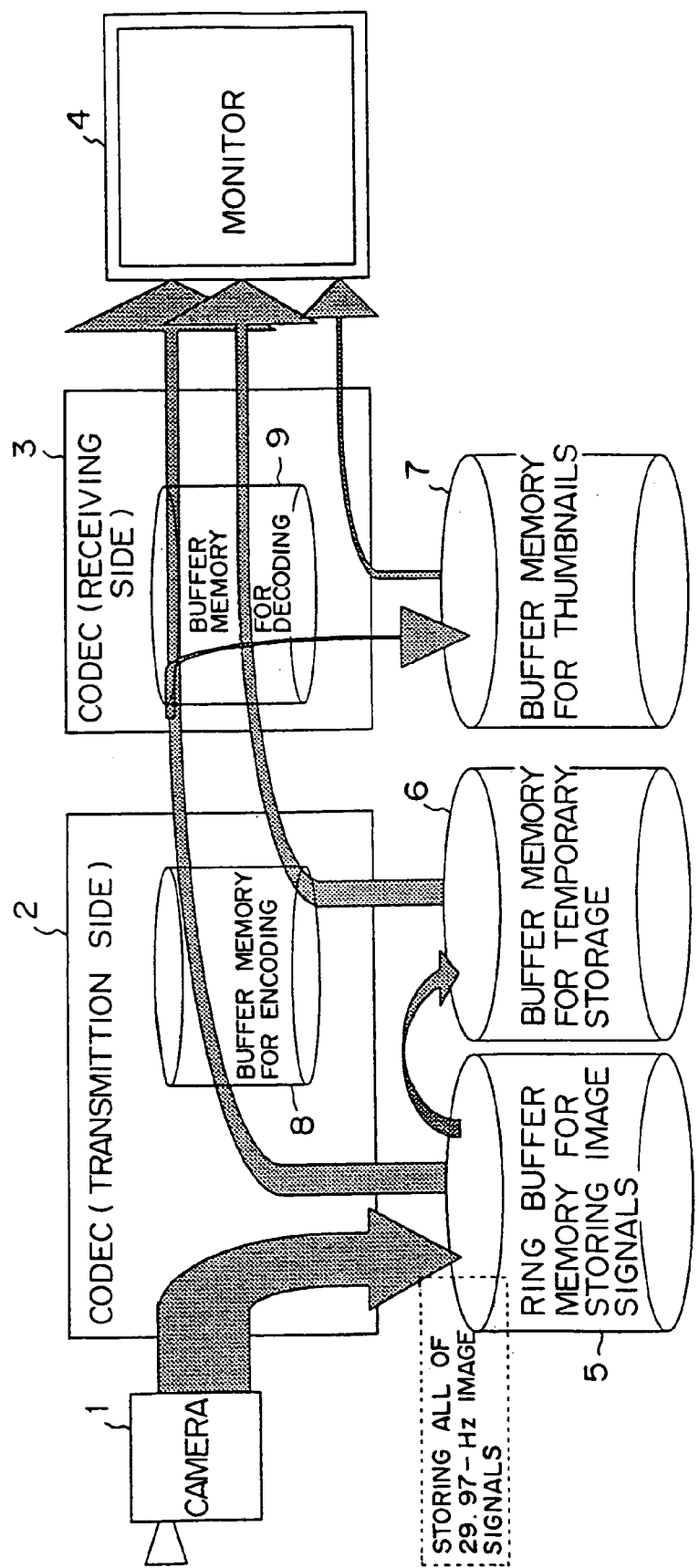
FIG. 4 shows three buffer memory types used in the system configuration according to a preferred embodiment of the present invention, and image data flow.

FIG. 4 shows three buffer memory types used in the system configuration according to the preferred embodiment of the present invention, and image data flow.

In this preferred embodiment, the following modes are prepared.

Note that a ring buffer memory 5 for storing image signals and a buffer memory 6 for temporary storage are arranged on a transmitting side, and a buffer memory 7 for thumbnails is arranged on a receiving side in this preferred embodiment.

1. Mode for Immediately Retransmitting a Sharp Image

The ring buffer 5 for storing image signals is prepared. All of 29.9-Hz image signals captured by a camera are digitized and stored in the ring buffer memory 5 for storing image signals. Then, an image signal obtained by reducing the amount of information of a captured signal (by sampling its pixel information) is input to a buffer memory 8 for encoding in a similar manner as in the conventional systems. The image signal is then encoded (compressed) and transmitted to a receiving side. On the receiving side, the signal is input to a buffer memory 9 for decoding within a codec 3, and decoded and output to a monitor 4. Since the pixel information of this image is sampled, its degree of sharpness is degraded. Therefore, this image is handled as an index-like quasi-moving image in normal cases. When a supervisor viewing the monitor 4 specifies a particular image on demand, and also specifies the mode for immediately retransmitting a sharp image, a codec 2 on the transmitting side reads the specified image frame from the ring buffer 5 for storing image signals, encodes (compresses) the read frame with the specified image encoding (compression) method, and immediately retransmits the encoded frame to the receiving side.

2. Mode for Sharply Reproducing an Image Stored at Arbitrary Timing by a Temporary Storage Request The receiving side issues an on-demand temporary storage request to the transmitting side. At the same time, the receiving side reduces the size of a normal index-like quasi-moving image which is currently being displayed, and stores the reduced image in the buffer memory 7 for thumbnails as a thumbnail to be described later.

The transmitting side to which the on-demand temporary storage request is issued transfers the specified image frame from the ring buffer memory 5 for storing image signals to the buffer memory 6 for temporary storage.

The receiving side, which issues an on-demand request to sharply reproduce a stored image at arbitrary timing, reads the information from the buffer memory 7 for thumbnails, and generates and displays a thumbnail. When the stored image frame to be reproduced is determined and selected based on a thumbnail, the receiving side then issues the on-demand request.

The transmitting side, to which the above described on-demand requests are issued, reads the specified stored image frame from the buffer memory 6 for temporary storage, encodes (compresses) the read frame with the specified image encoding (compression) method, and retransmits the encoded image to the receiving side.

The above described ring buffer for storing image signals is configured, for example, as follows.

image signal: NTSC 30 frames/second (actually, 29.97 frames/second)
  temporary storage time period: 3 seconds
  format: CIF (Y:352×288 U:176×144 V:176×144)

Here, CIF is an acronym for Common Intermediate Format for an image, which is used by H.261 and H.263. The CIF is defined as follows.

Number of temporarily stored frames:
  N=30 (frames/second)×3 (seconds)=90 (frames)
  Memory capacity of one CIF frame:
  Y=352 (pixels)×288 (lines)×8 (bits)=101,376 (bytes/frame)
  U=176 (pixels)×144 (lines)×8 (bits)=25,344 (bytes/frame)
  V=176 (pixels)×144 (lines)×8 (bits)=25,344 (bytes/frame)
  CIF frame size=Y+U+V=152,064 (bytes/frame)
  Entire memory capacity of the ring buffer for storing image signals:
  Total bytes=CIF frame size (bytes/frame)×N=13, 685,760 (bytes) (This can be implemented by 2 or 4 commercial 64M-bit DRAMs).

Figure 5:
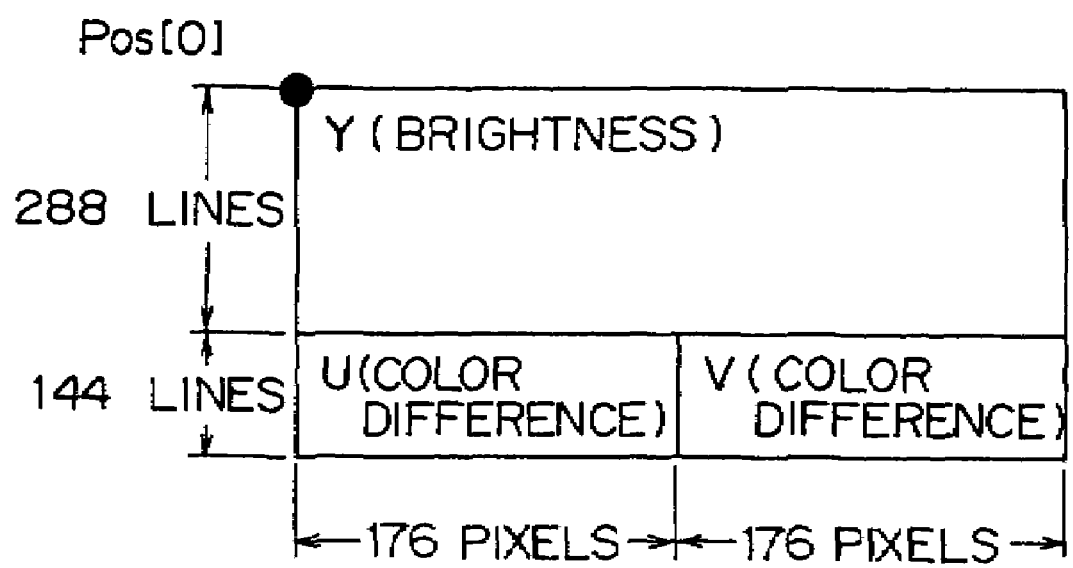
FIG. 5 shows the storage format of a CIF frame.

FIG. 5 shows the storage format of a CIF frame.

Figure 6:
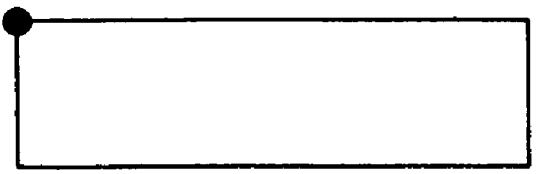
FIG. 6 shows the configuration of a ring buffer memory for storing image signals.
Figure 6:
Figure 6:
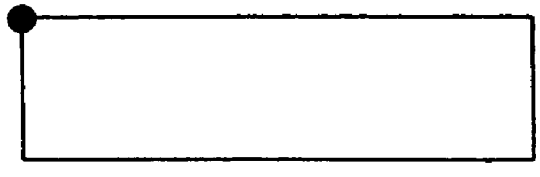
Figure 6:
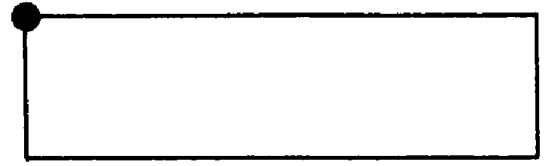

A CIF frame is always stored in this format within a memory, and managed by a starting point (represented by a black circle at the upper left of FIG. 5). Managed variables are defined as an array Pos[n] ($0 \leq n < N$) of a structure. Specifically, they are defined to be array variables in the following form.

struct{
    unsigned long int x;
    unsigned long int y;
  }Pos[N];

FIG. 6 shows the configuration of the ring buffer memory for storing image signals.

This figure shows the configuration composed of "N" CIF formats (see FIG. 5). The starting point of the x and y axes of each of the CIF formats is represented by "Pos[n].x, Pos[n].y". Here, "N" is a constant (90), and "n" indicates a variable ($0 \leq n < N$).

Figure 7:
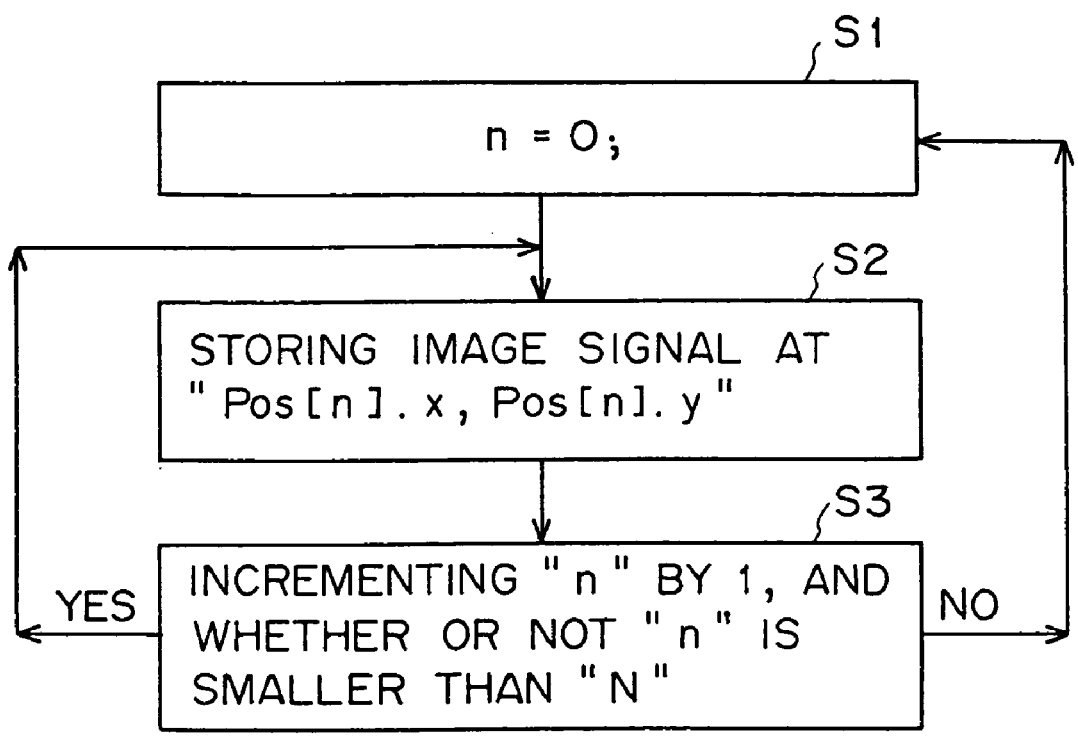
FIG. 7 is a flowchart showing the process for performing a write operation to the ring buffer memory for storing image signals.

FIG. 7 is a flowchart showing the process for performing a write operation to the ring buffer memory for storing image signals.

The variable "n" is sequentially added in the range of $0 \leq n < N$, and the value of "n" is reset to "0" when "n" becomes equal to "N", so that the ring buffer is configured.

First of all, in step S1, "n" is initialized to "0". Next, an image signal is stored at an address represented by "Pos[n].x, Pos[n].y" in step S2. In step S3, "n" is incremented by 1, and whether or not "n" is smaller than "N" is determined. If "n" is determined to be smaller than "N", the process goes back to step S2, and the operations are repeated. If n" is determined not to be smaller than "N" in step S3, the process goes back to step S1.

Figure 8:
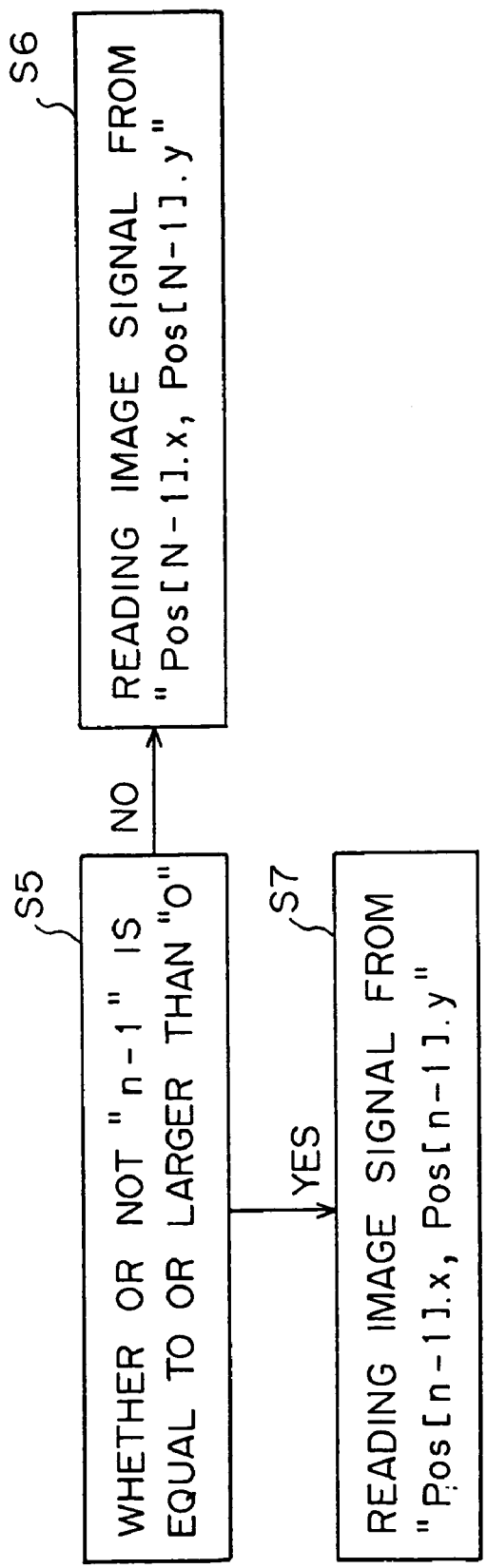
FIG. 8 is a flowchart showing the process for performing a read operation from the ring buffer memory for storing image signals.

FIG. 8 is a flowchart showing the process for performing a read operation from the ring buffer for storing image signals.

First of all, in step S5, whether or not "n−1" is equal to or larger than "0" is determined. If "n−1" is determined to be equal to or larger than "0", an image signal is read from the address represented by "Pos[n−1].x, Pos[n−1].y". If "n−1" is determined not to be equal to or larger than "0" in step S5, an image signal is read from the address represented by "Pos[N−1].x, Pos[N−1].y". In this way, an "N−1"-th image is read if "n" is equal to "0", whereby a memory can be used as a ring state.

Figure 9:
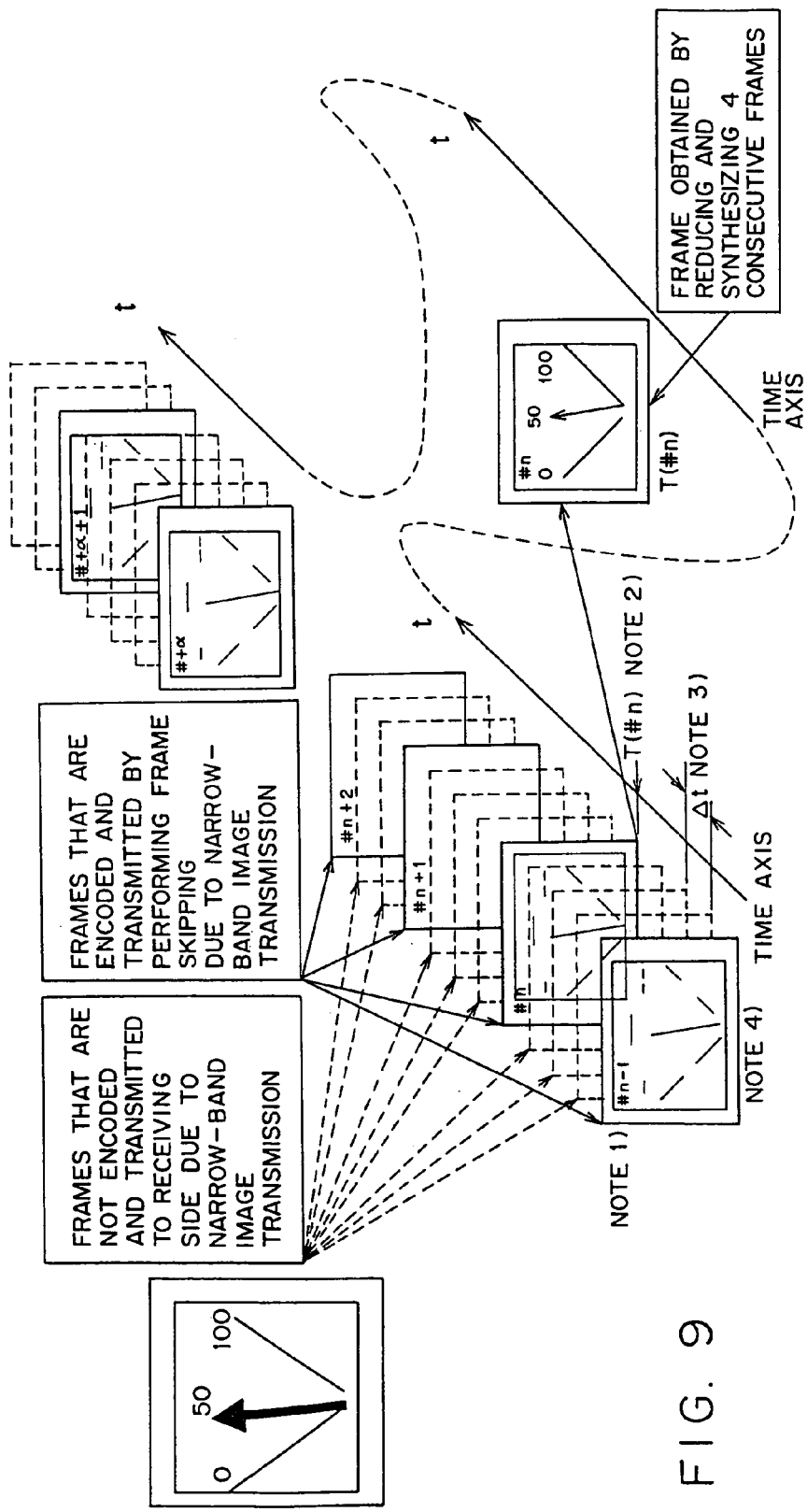
FIG. 9 shows the method for retransmitting an image with a high resolution (a high degree of sharpness), which is implemented by a single sharp image frame retransmission method according the present invention.

FIG. 9 shows the method for retransmitting an image with a high resolution (a high degree of sharpness), which is implemented by a single sharp frame retransmission according to the present invention.

A subject shown at the left end is one type of a meter requiring a high resolution. The center of this figure shows the state of the quasi-moving image transmitted with a conventional narrow-band image transmission method. In this case, the resolution is degraded (represented by being shaded and by appearance of the meter), and frames to be encoded and transmitted are aligned in a time axis direction. The right end of this figure shows a retransmitted frame with a high degree of sharpness according to this preferred embodiment. This is the state where a quasi-moving image transmitted with a normal image transmission method is used as an index, a retransmission of an #n image with a high degree of sharpness is requested, a normal quasi-moving image transmission is suspended, and the #n image frame with the high degree of sharpness is transmitted.

As described, low-resolution frames are normally transmitted by skipping frames as shown by the shaded frames. Frame skipping is to skip frames against the rate of 30 frames/second, which is the normal moving image transmission rate.

A frame identifier and a time identifier are assigned to each low-resolution frame. If a sharp image of a particular image is desired to be viewed on a receiving side, the desired frame is identified by specifying one of low-resolution frames. The identifiers of this frame are transmitted to a transmitting side, which is made to transmit the corresponding sharp image. Thus, a normally transmitted low-resolution frame serves as an index for identifying an image with a high degree of sharpness.

Figure 10:
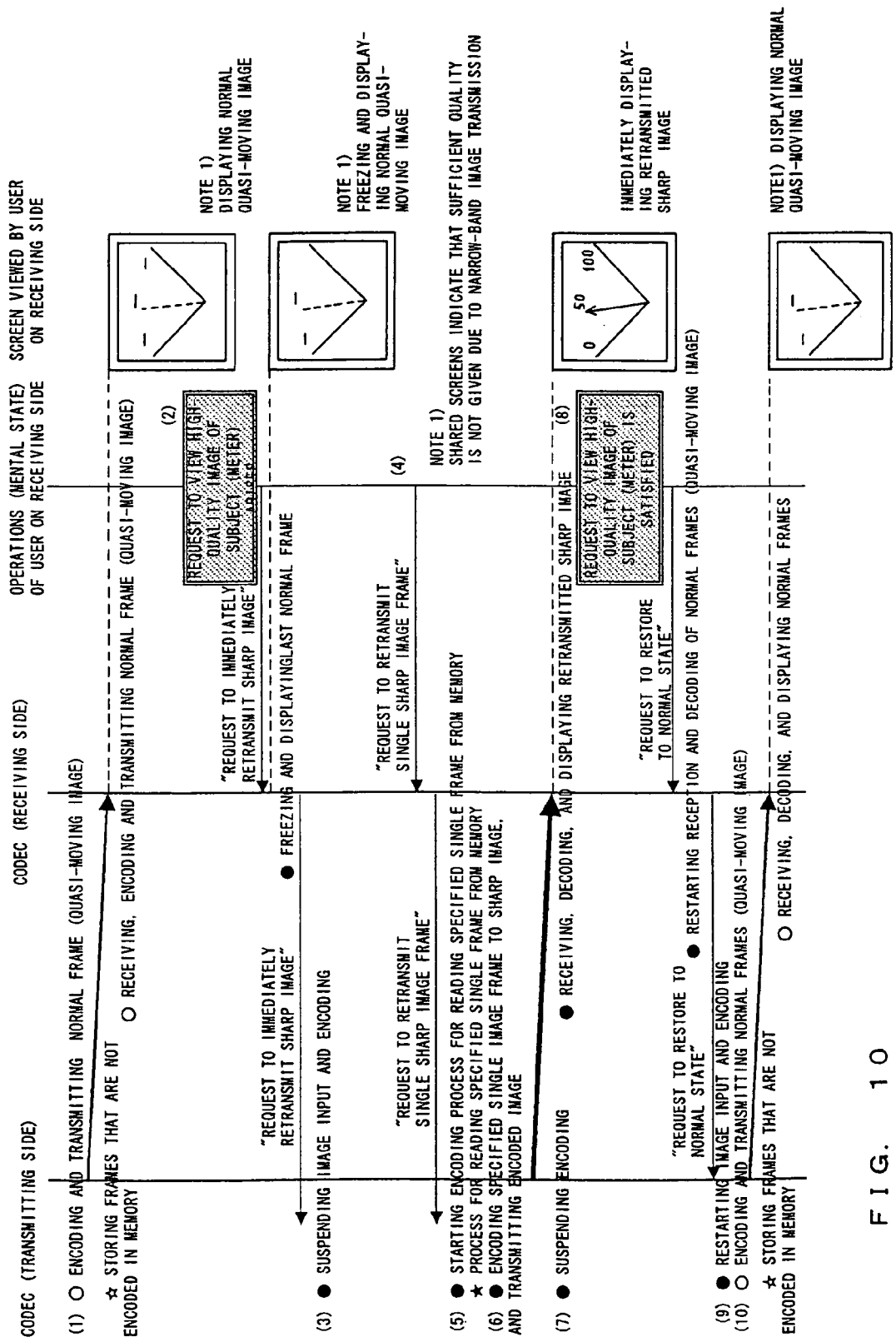
FIG. 10 shows the sequence for requesting a retransmission of a single sharp image frame, which corresponds to the method shown in FIG. 9.

FIG. 10 shows the sequence for requesting a retransmission of a single sharp image frame, which corresponds to the method shown in FIG. 9.

First of all, a codec on a transmitting side encodes normal frames (quasi-moving image), and transmits the encoded frames to a receiving side in (1). The receiving side receives, decodes, and displays the quasi-moving image transmitted from the transmitting side. Then, a user on the receiving side observes the quasi-moving image. FIG. 10 shows the state where a meter is displayed as a subject. Here, if the user on the receiving side desires to view a high-quality image of the meter in (2), he or she issues the request to immediately retransmit a sharp image of the meter to the transmitting side. At this time, the receiving side freezes and displays the last quasi-moving image (normal frame). Upon receipt of this request, the transmitting side suspends an image input and encoding in (3). Next, the receiving side specifies a particular frame, and issues a request to retransmit a single sharp image frame to the transmitting side in (4). The transmitting side then starts encoding in (5), and reads the single frame specified by the receiving side from a memory. The transmitting side encodes the single frame to a sharp frame, and retransmits the encoded frame in (6). Upon termination of the transmission, the transmitting side suspends the encoding in (7). The receiving side receives, decodes, and displays the retransmitted sharp frame. When the request to view an image of a high degree of sharpness is satisfied on the receiving side in (8), a request to restore to the normal state is issued to the transmitting side.

Upon receipt of the request to restore to the normal state, the transmitting side restarts an image input and encoding in (9), encodes normal frames (quasi-moving image), and transmits the encoded normal images to the receiving side in (10). In this way, the quasi-moving image is again displayed on the receiving side. At this time, the transmitting side transmits normal frames while storing the data of sharp images that are not encoded in the ring buffer memory. By always storing the data of sharp images, by way of example, for 3 seconds, a corresponding image with a high degree of sharpness can be retransmitted at any timing within the 3 seconds from when a quasi-moving image is displayed on the receiving side. Especially, if the meter is displayed as a quasi-moving image and the scale of the meter cannot be read clearly as shown in FIG. 10, it is possible to make the transmitting side retransmit a corresponding sharp image by specifying the quasi-moving image displaying the meter as an index. Accordingly, if a worker on the transmitting side is an inspector of a plant, etc., the method with which not only the inspector but also the control room being the receiving side can verify whether the value of the meter is either normal or abnormal, is enabled.

Figure 11:
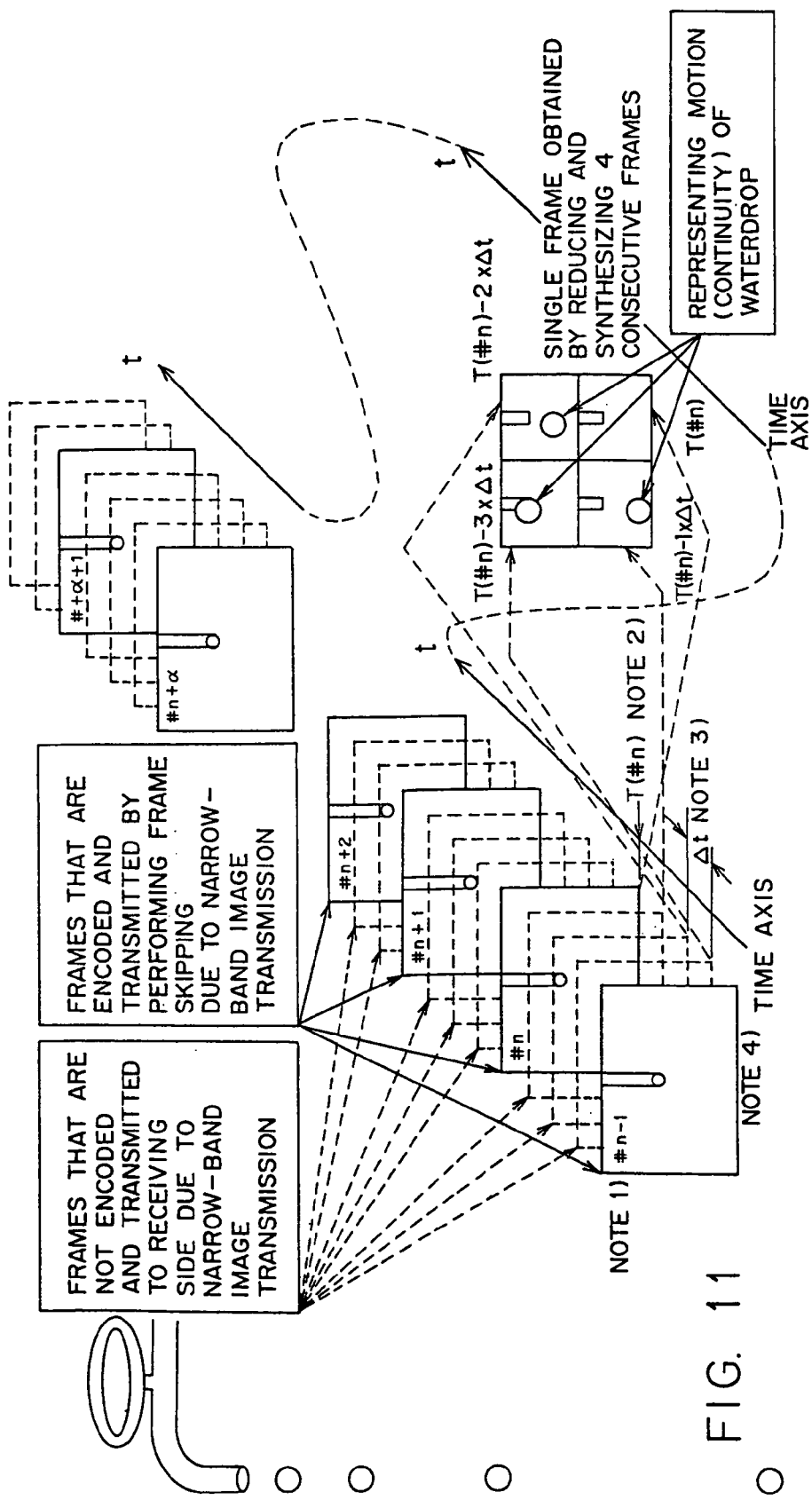
FIG. 11 shows the method for retransmitting an image to verify the motion (continuity) of a subject, which is implemented by a retransmission of a sharp frame obtained by reducing and synthesizing a series of image frames according to this preferred embodiment.

FIG. 11 shows the method for retransmitting an image so as to verify the motion (continuity) of a subject, which is implemented by a retransmission of a frame obtained by reducing and synthesizing a series of frames according to this preferred embodiment.

A subject shown at the left end is a waterdrop the motion of which is required to be sharply reproduced. The center of this figure shows the state of the quasi-moving image transmitted with a conventional narrow-band image transmission method. In this case, the resolution is degraded (represented by being shaded and appearance of the meter), and image frames to be encoded and transmitted are aligned in a time axis direction. The right end shows a reduced, synthesized, and retransmitted sharp frame according to this preferred embodiment. This is the state where a quasi-moving image transmitted with a normal image transmission method is used as an index, a retransmission of four sharp frames obtained by reducing and synthesizing an #n frame and its 3 preceding frames is requested, and the motion (continuity) of the image frames in the proximity of the #n frame is again verified in the state where the normal quasi-moving image transmission is suspended.

Since image frames are normally transmitted in a narrow-band, quasi-moving image frames with a lower resolution (represented by being shaded) are transmitted. The quasi-moving image frames are transmitted at a rate that is lower than the rate of 30 frames/second, which is the display rate of a normal moving image. An index like "#n" is assigned to each of the frames of the quasi-moving image as shown in this figure. The receiving side makes the transmitting side transmit a sharp image of a corresponding frame by transmitting the frame and the time identifiers of the frame. At this time, in this preferred embodiment, the transmitting side generates a frame by reducing and synthesizing 4 consecutive frames in order to view the motion of the subject in the frames preceding and succeeding a particular frame, and the receiving side receives the generated frame. As a result, the consecutive frames can be viewed as one frame within a series of image frames, whereby the details of the subject in the frames consecutive to a particular frame can be observed by an on-demand request issued from the user observing a quasi-moving image on the receiving side.

Note that images stored in the ring buffer on the transmitting side are used as sharp images for generating a reduced and synthesized frame, and an existing technique is used as the technique for synthesizing frames.

Figure 12:
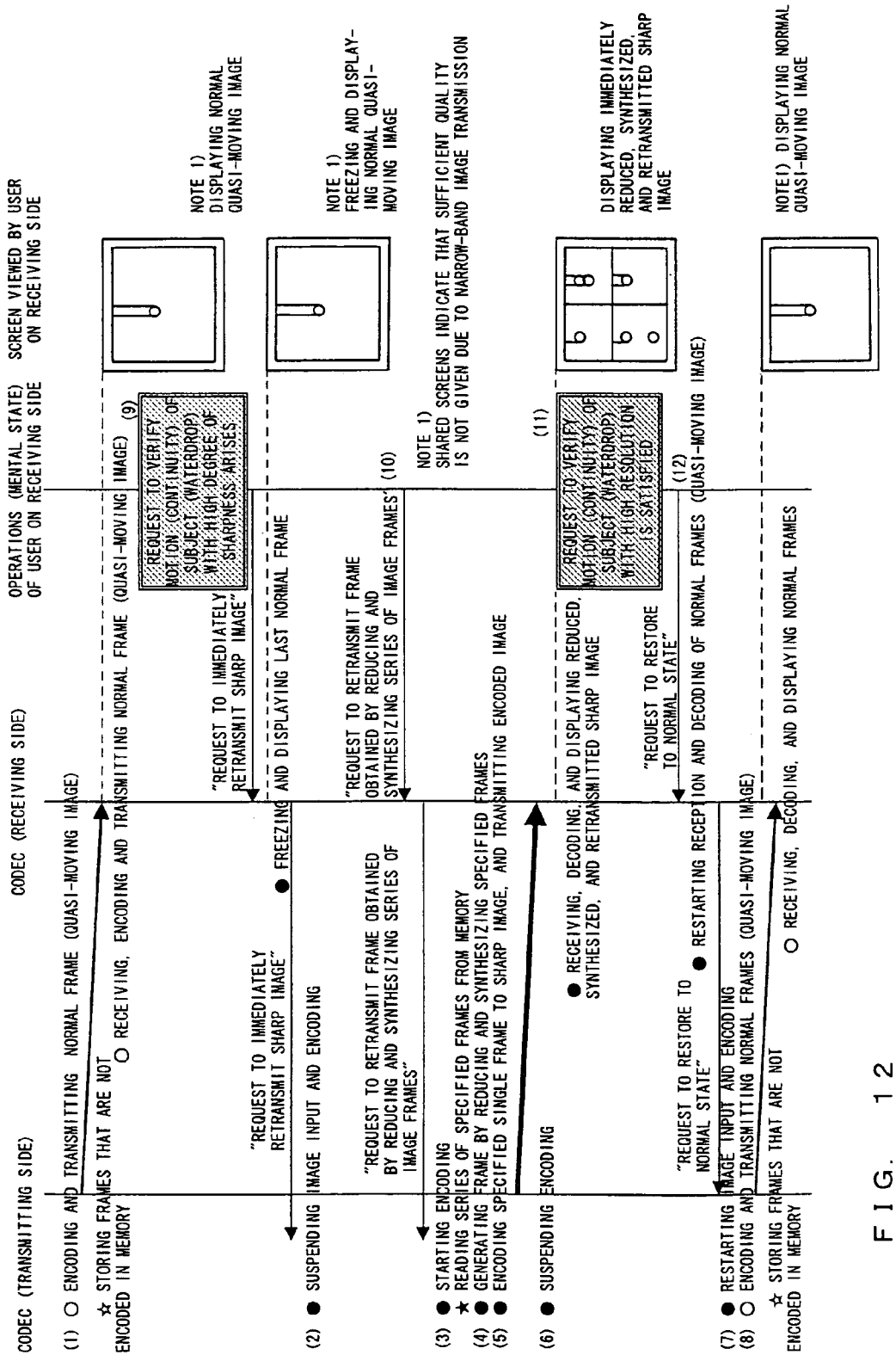
FIG. 12 shows the sequence for requesting a retransmission of a sharp frame obtained by reducing and synthesizing a series of image frames, which corresponds to the method shown in FIG. 11.

FIG. 12 shows the sequence for requesting a retransmission of a sharp frame obtained by reducing and synthesizing a series of image frames, which corresponds to the method shown in FIG. 11.

The transmitting side encodes and transmits a quasi-moving image in a normal state. At the same time, the transmitting side stores frames that are not encoded in a ring buffer so that the frames can be retransmitted when a sharp image is requested. The storage quantity is, for example, frames corresponding to a moving image for 3 seconds. The receiving side receives, decodes, and displays the quasi-moving image transmitted from the transmitting side. When the user on the receiving side desires to view the details of a subject (in FIG. 12, the motion (continuity) of the waterdrop) in (9), the user issues a request to immediately start a retransmission of a sharp image to the transmitting side. At this time, the last normal frame (quasi-moving image) is frozen and displayed.

Figure 13A:
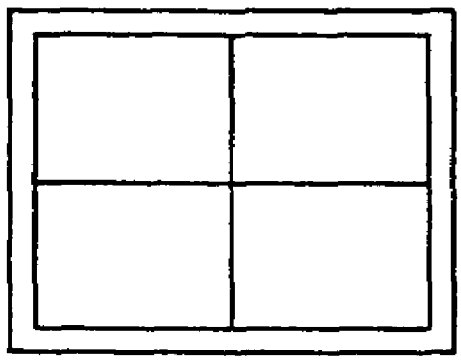
FIGS. 13A and 13B exemplify synthesized screens.
Figure 13B:
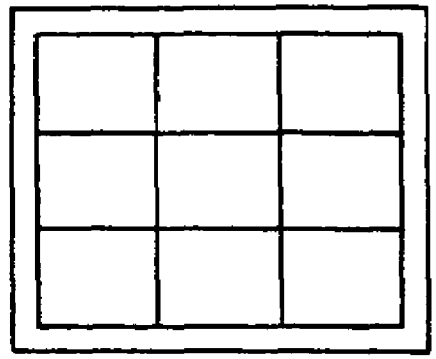

The transmitting side that receives this request suspends an image input and encoding in (2). Next, the receiving side generates a request to retransmit a sharp image obtained by reducing and synthesizing a series of image frames in (10), and issues the generated request to the transmitting side. The transmitting side that receives this request starts encoding in (3), and reads the series of specified frames from a memory. Here, a series of frames may be specified in a way such that one frame of a quasi-moving image is specified on a receiving side, and the number of frames consecutive to the specified frame may be set in a system, or a user on the receiving side may specify the number of consecutive frames to be retransmitted. Since the number of frames to be synthesized for one screen is determined according to the specified number of consecutive frames in this case, frame synthesis must be suitably performed. FIGS. 13A and 13B exemplify synthesized screens. FIG. 13A shows the screen obtained by reducing and synthesizing 4 frames, whereas FIG. 13B shows the screen obtained by reducing and synthesizing 9 frames. Or, a screen may be configured by reducing and synthesizing 16 frames.

The transmitting side that starts encoding then generates a screen by reducing and synthesizing a series of specified frames in (4), encodes the generated screen to a sharp frame by recognizing the reduced and synthesized screen as the specified single frame, and retransmits this frame in (5). Here, an existing method is used as the method for generating a reduced and synthesized screen. After encoding and transmitting the frame, the transmitting side suspends the encoding in (6). The receiving side receives the reduced, synthesized, and retransmitted sharp frame, and decodes and displays this frame. In this way, the reduced and synthesized sharp image can be displayed on the receiving side. The user on the receiving side observes this reduced and synthesized screen, and issues a request to restore to a normal state to the transmitting side when the request to view the details of the subject (the motion of the waterdrop in FIG. 12) is satisfied in (12).

The transmitting side that receives the request to restore to the normal state restarts an image input and encoding in (7), and encodes and transmits normal frames (quasi-moving image) in (8). The state is restored to the normal quasi-moving image transmission state. As described above, the transmitting side stores moving image frames that are not encoded in the ring buffer memory while transmitting a normal quasi-moving image, so as to immediately respond to a request from the receiving side.

Figure 14:
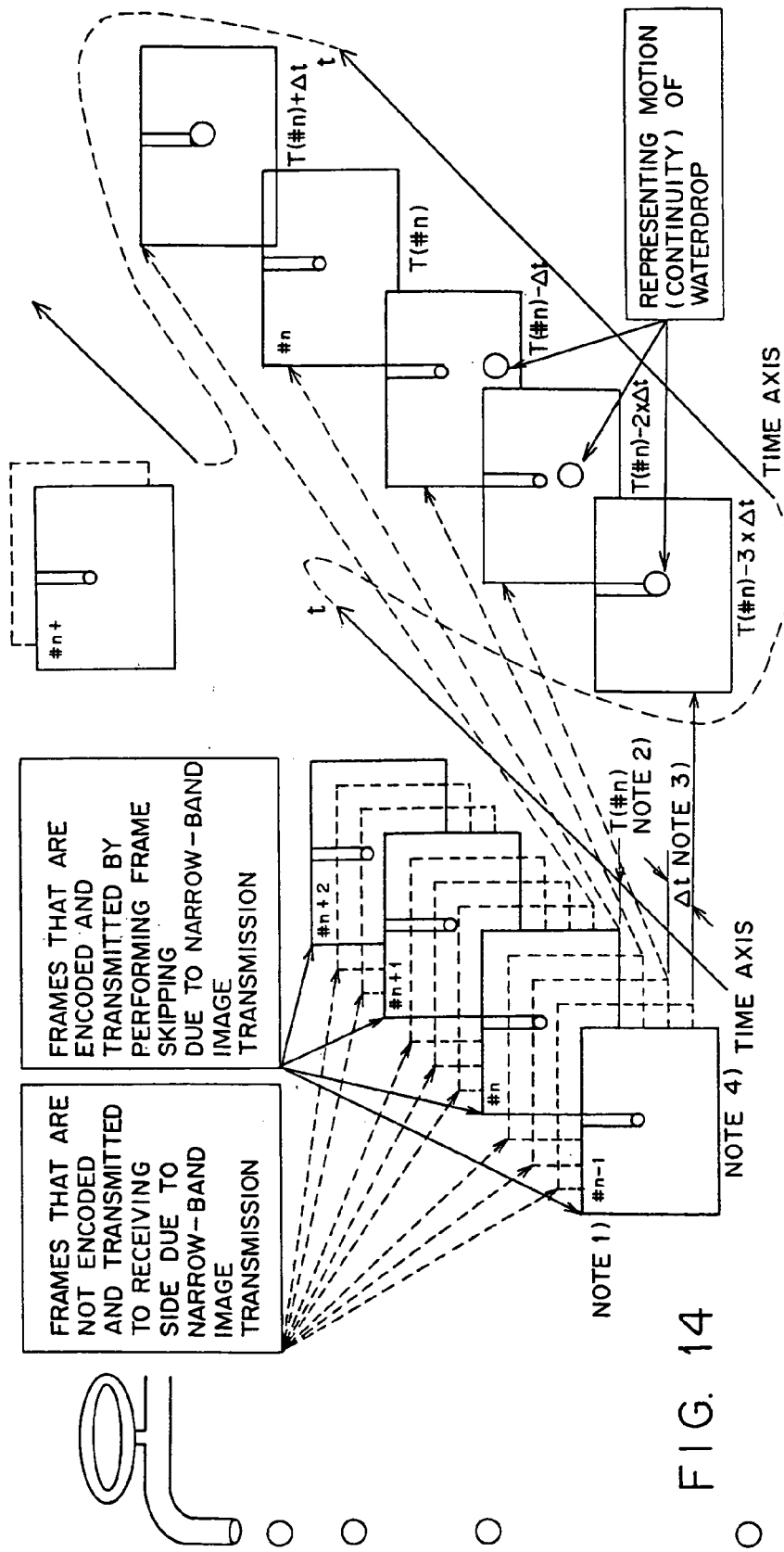
FIG. 14 shows the method for verifying the resolution (the degree of sharpness) of an image and the motion (continuity) of a subject on a receiving side, which is implemented by a sharp image retransmission of a series of image frames according to one preferred embodiment.

FIG. 14 shows the method for again verifying the resolution (the degree of sharpness) of an image and the motion (continuity) of a subject on a receiving side, which is implemented by a sharp image retransmission of a series of image frames according to one preferred embodiment of the present invention.

The subject shown at the left end is a waterdrop the motion of which is required to be verified with high resolution. The center of this figure shows the state of a quasi-moving image transmitted with a conventional narrow-band image transmission method. In this case, the resolution is degraded (represented by being shaded and appearance of a meter), and image frames to be encoded and transmitted are aligned in a time axis direction. The right end shows retransmitted sharp frames according to this preferred embodiment. This is the state where a quasi-moving image transmitted with a normal image transmission method is used as an index, a retransmission of 5 sharp image frames in the proximity of #n is requested, and the resolution (the degree of sharpness) and the motion (continuity) of the 5 image frames in the proximity of #n is again verified on the receiving side in the state where the normal quasi-moving image transmission is suspended.

The quasi-moving image in the center of this figure is composed of image frames with a low quality in a similar manner as in the above described preferred embodiment. These image frames are transmitted at a rate lower than that of 30 frames/second, which is the stipulated display rate of a moving image. An index like #n is assigned to each of the frames of the quasi-moving image. The receiving side specifies one of the quasi-moving image frames, so that the frame and the time identifiers of this frame can be specified. The transmitting side retrieves the frame corresponding to the specified quasi-moving image frame from the ring buffer memory by using the frame and the time identifiers, and transmits the retrieved frame as a sharp image. At this time, a predetermined number of frames succeeding or preceding a specified frame are encoded and transmitted to the receiving side in this preferred embodiment. In this way, the receiving side can view the sharp moving image of the frames preceding or succeeding the frame specified within the quasi-moving image. Because the quasi-moving image is transmitted so as to suit the bandwidth of a narrow-band image transmitting system at this time, it can be transmitted in real time. However, much more information must be transmitted when a sharp moving image is transmitted in response to a request from the receiving side. Therefore, more time is taken to transmit a sharp moving image than to transmit a quasi-moving image. Accordingly, the receiving side can view the motion of the subject as a sharp image, but a moving image is reproduced as if it is a slow-motion replay in contrast with a real time elapse.

Figure 15:
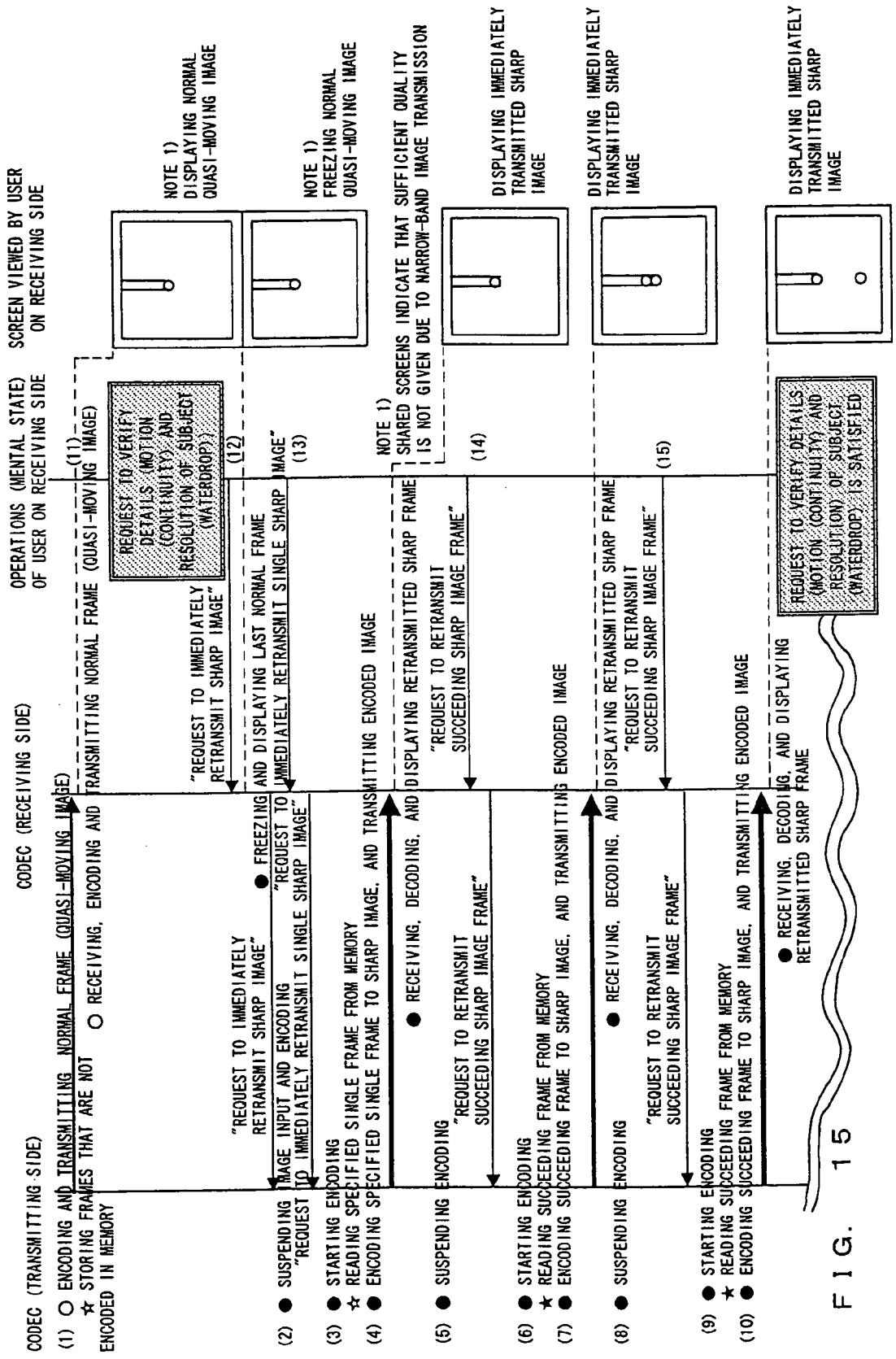
FIG. 15 shows the sequence for requesting a retransmission of a sharp image of a series of image frames, which corresponds to the method shown in FIG. 14.

FIG. 15 shows the sequence for requesting a retransmission of a sharp image of a series of image frames, which corresponds to the method shown in FIG. 14.

In a normal state, the transmitting side encodes a quasi-moving image, and transmits the encoded image to the receiving side in (1). At this time, the transmitting side stores frames that are not encoded in the ring buffer memory. The receiving side receives, decodes, and displays the quasi-moving image. The receiving side then presents it to a user in (11). When the user on the receiving side desires to verify the details (motion) of the subject (in FIG. 15, the motion (the continuity) of the waterdrop), the receiving side issues a request to immediately start a retransmission of a sharp image to the transmitting side in (12). At this time, the last normal frame is frozen and displayed.

The transmitting side that receives this request suspends an image input and encoding in (2). Then, the receiving side issues a request to retransmit a single sharp image frame to the transmitting side. Upon receipt of this request, the transmitting side starts encoding in (3). At the same time, the transmitting side reads the single frame specified by the receiving side from the ring buffer memory. A single frame may be specified on the receiving side in either of the following ways in a similar manner as in the above described preferred embodiment. That is, the user on the receiving side issues the request to retransmit a single sharp image frame in the state where one frame of a quasi-moving image is frozen, so that a single sharp image frame can be automatically specified. Or, a menu for specifying a frame is displayed on a monitor, and the user on the receiving side may directly input the identifier of a specified frame.

When the specified single frame is read from the memory, the transmitting side encodes the specified single frame to a sharp image and transmits the encoded image in (4). The transmitting side then suspends the encoding in (5). This sharp image is transmitted to the receiving side, which decodes and displays this image. When the image is displayed, the receiving side automatically issues a request to retransmit the succeeding sharp image frame in (14).

Upon receipt of this request, the transmitting side restarts encoding, and reads the succeeding image frame from the ring buffer memory in (6). Then, the transmitting side encodes the succeeding image frame to a sharp image, transmits the encoded image in (7), and suspends the encoding in (8). The receiving side receives, decodes, and displays the retransmitted sharp frame of the succeeding frame. Simultaneously with the display of the frame, the receiving side further issues the request to retransmit the succeeding sharp image frame to the transmitting side in (15).

Upon receipt of this request, the transmitting side starts encoding, and reads the succeeding image frame from the ring buffer in (9). Then, the transmitting side encodes the succeeding frame to a sharp image, and transmits the encoded image in (10). The receiving side decodes and displays the transmitted image. Such a process is repeated, the number of times of which correspond to a predetermined number of frames. In this way, the display of the predetermined number of frames is completed. If the user on the receiving side cancels the request to verify the details (motion) of the subject, the transmission state is restored to the normal frame (quasi-moving image) transmission in a similar manner as in the sequence in the above described preferred embodiment.

Figure 16:
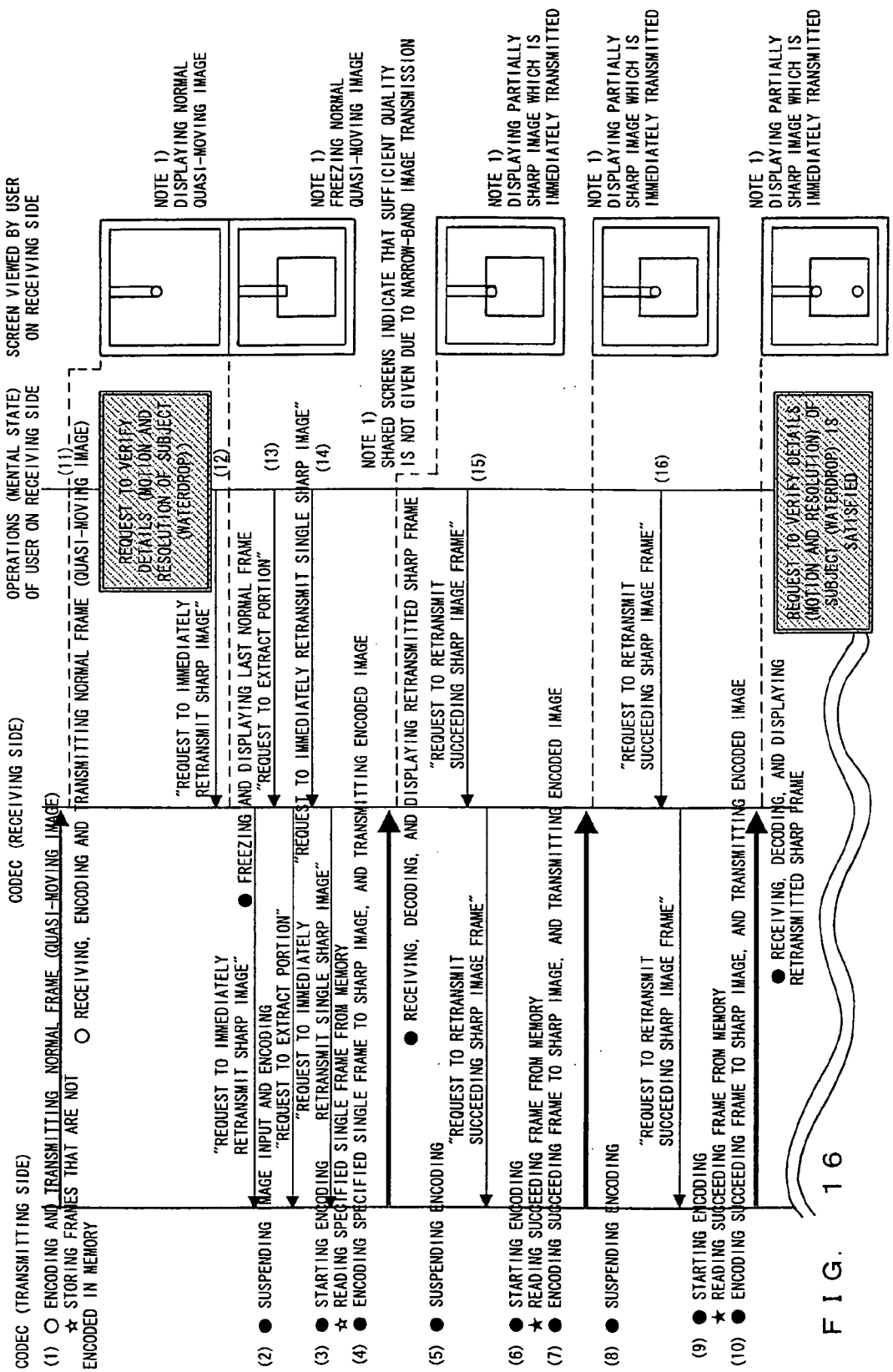
FIG. 16 shows the sequence for requesting a retransmission of a partial sharp image of a series of image frames.

FIG. 16 shows the sequence for requesting a retransmission of a partial sharp frame of a series of image frames.

In this preferred embodiment, when high-quality motion is desired to be viewed, the amount of information, which is transmitted from the transmitting side, is reduced by specifying not the whole but part of a screen.

First of all, in a normal state, the transmitting side encodes a quasi-moving image, and transmits the encoded image to the receiving side in (1). The receiving side receives this quasi-moving image, and displays the image on a monitor in (11). When the user on the receiving side, who observes the quasi-moving image transmitted from the transmitting side, desires to verify the details of the subject, he or she issues a request to immediately retransmit a sharp frame to the transmitting side in (12). At this time, the last normal frame is frozen and displayed. Upon receipt of this request, the transmitting side suspends an image input and encoding in (2). The receiving side further issues to the transmitting side a partial extraction request to specify a portion extracted from an image in (13). Then, the receiving side transmits the request to retransmit a single sharp image frame to the transmitting side in (14). The transmitting side that receives these requests starts encoding, and at the same time, it reads the specified single frame from the ring buffer memory, and extracts the specified portion in (3). The transmitting side then encodes the specified portion to a sharp image, transmits the partial image to the receiving side in (4), and suspends the encoding in (5). The partial sharp image, which is transmitted from the transmitting side, is decoded and displayed on the receiving side. Then, the receiving side issues the request to retransmit the succeeding sharp image frame in (15).

The transmitting side that receives this request starts encoding, reads the succeeding frame from the ring buffer, encodes the specified portion to a sharp image, and transmits the partial sharp image in (6) and (7). The transmitting side then suspends the encoding in (8). In this way, the succeeding sharp image frame is transmitted to the receiving side, which decodes and displays this frame as described above. Furthermore, the receiving side transmits the request to retransmit the succeeding sharp image frame to the transmitting side, which is then made to transmit the succeeding frame.

The transmitting side that receives this request starts encoding, reads the succeeding frame from the ring buffer memory, encodes the succeeding frame to a partial sharp image, and transmits this image in (9) and (10) as described above. In this way, a predetermined number of sharp images are transmitted to the receiving side. When the request to verify the details of the subject is satisfied, the transmission state is restored to the normal state in a similar manner as in the above described preferred embodiment.

Here, an existing technique is assumed to be used as the method for extracting a portion from one image frame, and for encoding the extracted portion to a sharp image.

Figure 17:
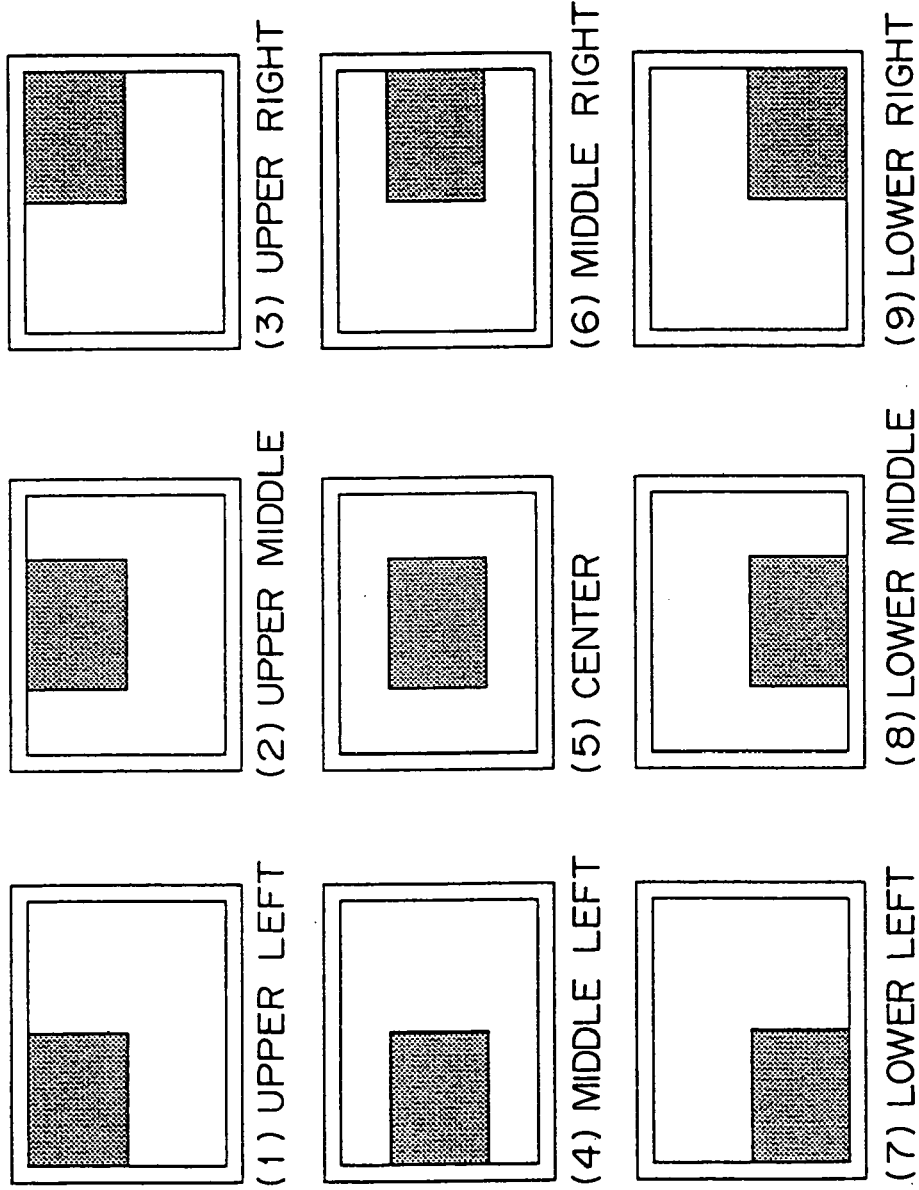
FIG. 17 exemplifies portions to be partially extracted from an image frame, which are specified on the receiving side.

FIG. 17 exemplifies portions to be extracted from an image frame, which are specified on the receiving side. 9 patterns shown in (1) through (9) of this figure may be preset, or a user may arbitrarily specifies a portion.

Figure 18:
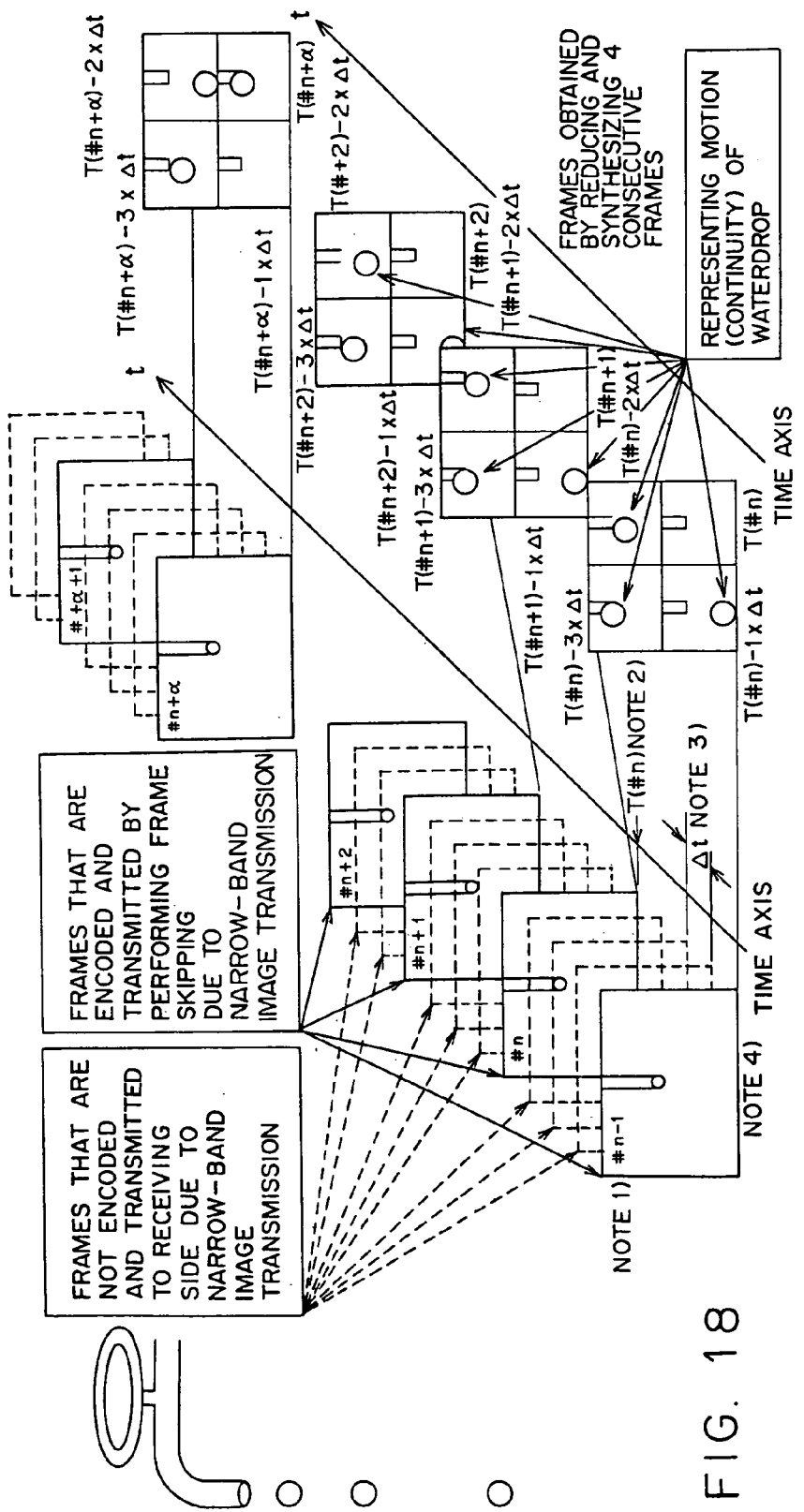
FIG. 18 shows the method for continuously verifying the motion (continuity) of a subject by repeating reduction and synthesis according to one preferred embodiment of the present invention.

FIG. 18 shows the method for continuously verifying the motion (the continuity) of a subject by repeating the reduction and synthesis, which is one preferred embodiment of the present invention.

The subject shown at the left end is a waterdrop the motion of which is required to be verified. The center of this figure shows the state of a quasi-moving image transmitted with a conventional narrow-band image transmission method. In this case, the resolution is degraded (represented by being shaded and by appearance of the meter), and image frames to be encoded and transmitted are aligned in a time axis direction. The right end shows transmitted (not retransmitted) frames obtained by being reduced and synthesized according to this preferred embodiment. This is the state where a continuous transmission (not retransmission) of frames obtained by reducing and synthesizing 4 frames is requested, and the motion (continuity) is continuously verified by using the frames obtained by reducing and synthesizing 4 frames in the state where the normal quasi-moving image transmission is suspended.

As referred to in the above described preferred embodiment, quasi-moving image frames, to each of which an index such as #n is assigned, are transmitted at a rate lower than the rate of 30 frames/second in a normal state. Here, if a request to transmit a reduced and synthesized sharp frame in real time according to this preferred embodiment is issued to the transmitting side, a frame obtained by reducing and synthesizing 4 frames is transmitted at the timing when each quasi-moving image is transmitted. Accordingly, it is possible to view the motion of the subject in frames preceding and succeeding a certain frame as the single frame, thereby continuously observing the hig-quality motion of the subject.

Figure 19:
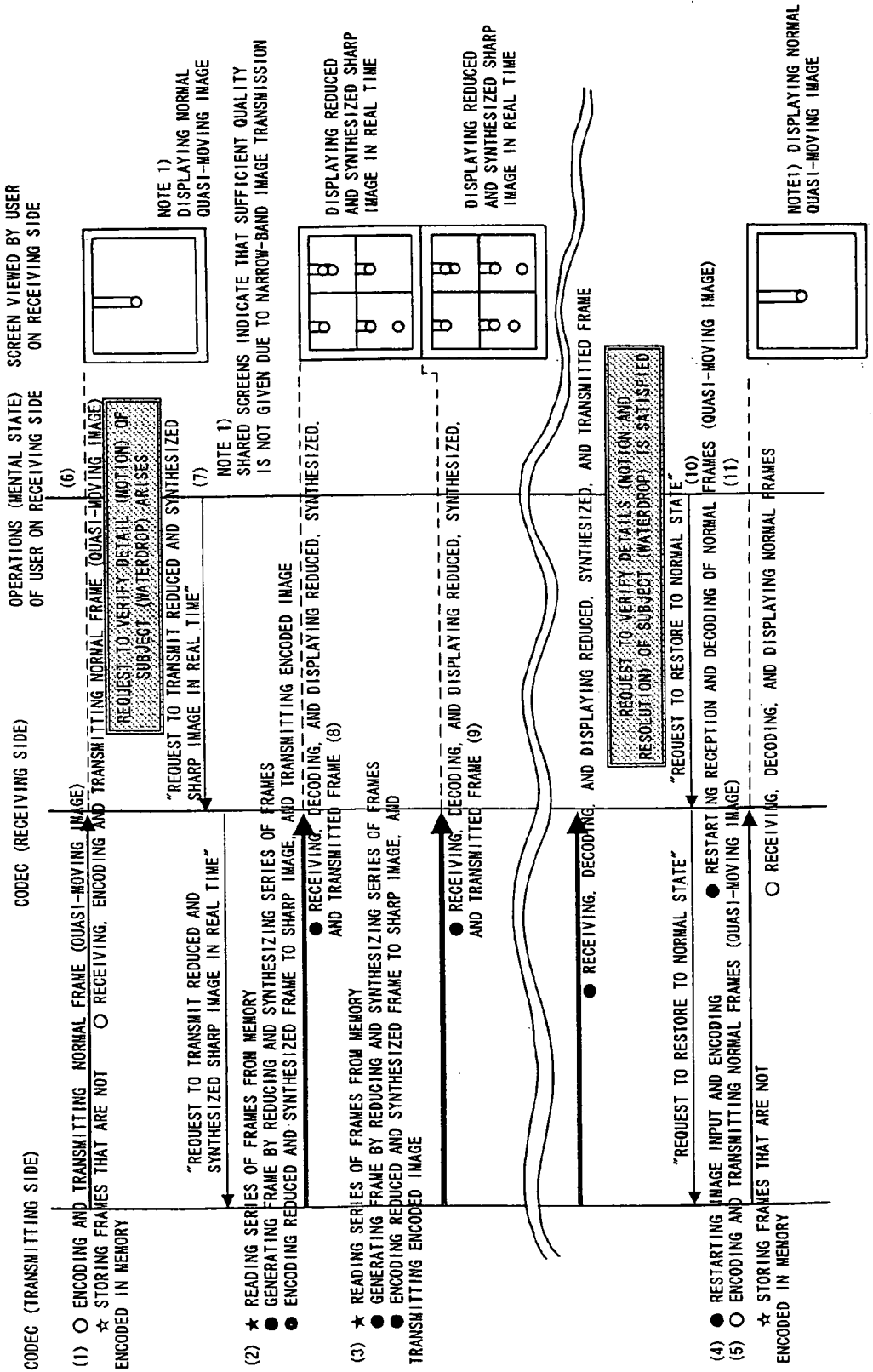
FIG. 19 shows the sequence for requesting a real-time transmission of reduced and synthesized frames, which corresponds to the method shown in FIG. 18.

FIG. 19 shows the sequence for requesting a real-time transmission of a reduced and synthesized sharp frame, which corresponds to the method shown in FIG. 18.

In a normal state, the transmitting side transmits a quasi-moving image to the receiving side. At the same time, the transmitting side stores frames that are not encoded in the ring buffer memory in (1). The receiving side receives, decodes, and displays the transmitted quasi-moving image in (6). Here, if the user on the receiving side desires to view the details of the subject, the user issues a request to transmit a reduced and synthesized sharp frame in real time to the transmitting side. The transmitting side that receives this request reads a series of frames from the ring buffer memory, generates a frame by reducing and synthesizing the series of frames, encodes the reduced and synthesized frame to a sharp frame, and transmits the encoded frame in (2). The reduced and synthesized frame transmitted in such a way is decoded and displayed on a monitor on the receiving side. The transmitting side further reads the succeeding series of frames from the ring buffer memory not by the request from the receiving side, generates a frame by reducing and synthesizing the series of frames, and transmits the reduced and synthesized frame to the receiving side in (3). This reduced and synthesized frame is decoded in succession to the immediately preceding reduced and synthesized frame, and displayed on the monitor on the receiving side in (9). In this way, reduced and synthesized frames are consecutively transmitted from the transmitting side. The receiving side can observe the motion of the subject in real time by consecutively displaying the reduced and synthesized frames. At this time, the transmission rate of the reduced and synthesized frames is the same as that of quasi-moving images. This is because the communications path is in a narrow-band, and images cannot be transmitted at the rate of 30 frames/second.

When the request to verify the details of the subject is satisfied on the receiving side, the receiving side issues the request to restore to the normal state to the transmitting side in (10). The transmitting side that receives this request restarts an image input and encoding in (4), and encodes and transmits normal frames (quasi-moving image). At the same time, the transmitting side stores frames that are not encoded in the ring buffer memory in (5). Upon receipt of the quasi-moving image, the receiving side decodes and displays this quasi-moving image in (11), and the transmission state is restored to the normal state.

Figure 20:
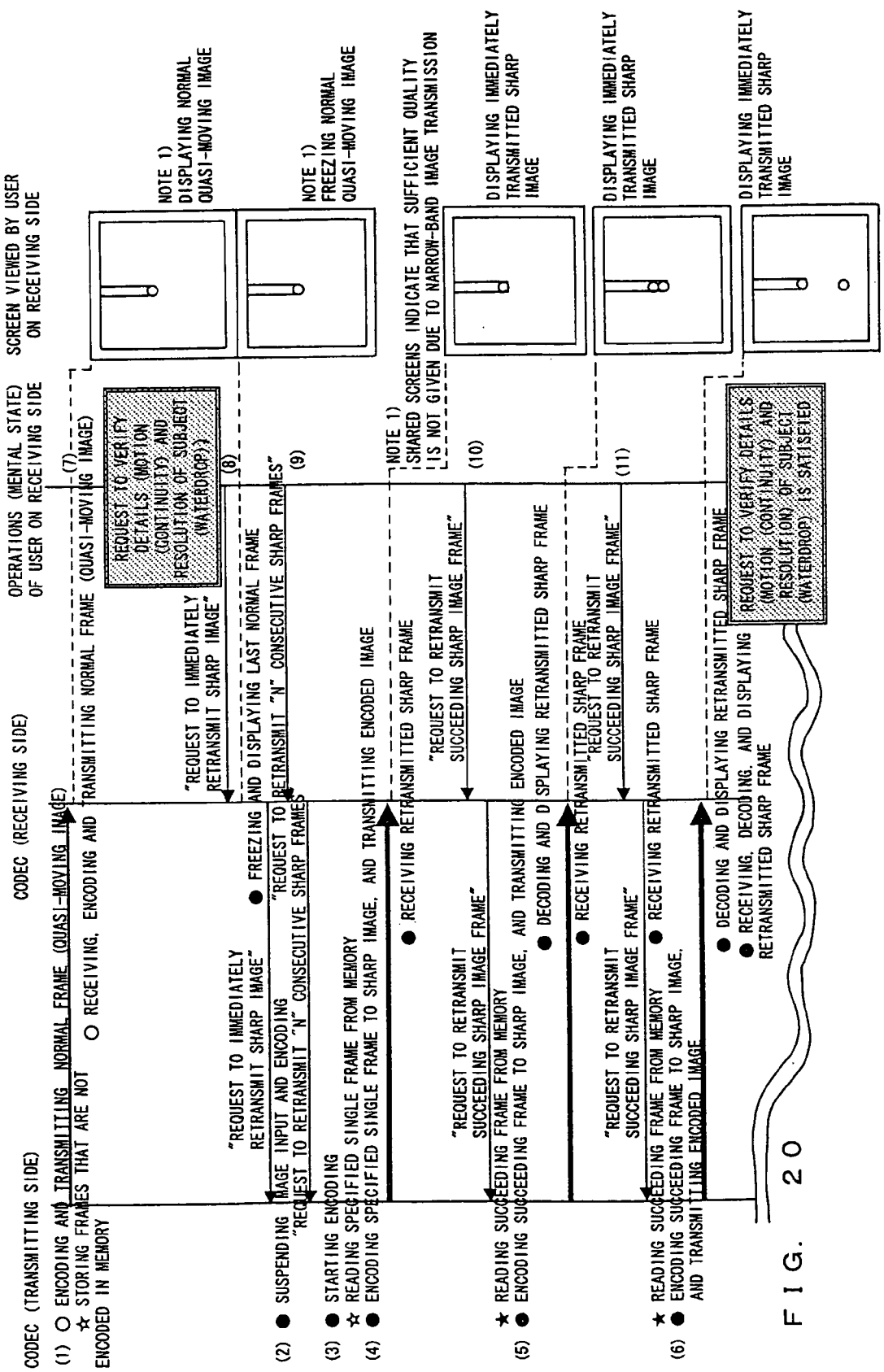
FIG. 20 shows the sequence for requesting a retransmission of a plurality of consecutive sharp frames according to another preferred embodiment of FIG. 15.

FIG. 20 shows the sequence for requesting a retransmission of a plurality of consecutive sharp frames as another preferred embodiment of FIG. 15.

In a normal state, the transmitting side encodes and transmits a quasi-moving image. At the same time, the transmitting side stores frames that are not encoded in the ring buffer memory in (1). The storage time period is an adequate period from 1 to 3 seconds, and this is similar in the above described preferred embodiment. The receiving side receives, decodes, and displays the transmitted quasi-moving image in (7). When the user on the receiving side desires to verify the details of the subject, he or she issues the request to immediately start a retransmission of a sharp image to the transmitting side. At the same time, the last normal frame (quasi-moving image) is frozen and displayed in (8).

The transmitting side that receives this request suspends an image input and encoding in (2). After the receiving side issues the request to immediately start a retransmission of a sharp image, it further issues a request to retransmit "N" ("N" is an integer) consecutive sharp frames to the transmitting side in (9). The transmitting side that receives this request starts encoding in (3), reads the specified single frame corresponding to the frozen quasi-moving image from the ring buffer memory, encodes the specified single frame to a sharp image, and transmits the encoded image in (4). The receiving side issues the request to retransmit the succeeding sharp image frame to the transmitting side the same time or before the transmitted sharp image is displayed on the monitor of the receiving side in (10). Upon receipt of the request to retransmit the succeeding sharp image frame, the transmitting side reads the succeeding frame from the ring buffer memory, encodes the read frame to a sharp image, and transmits the encoded image to the receiving side in (5). The receiving side receives, decodes, and displays this image, so that the succeeding sharp image is displayed on the monitor in (11). The receiving side again issues the request to retransmit the succeeding sharp frame to the transmitting side in (11). The transmitting side that receives this request further reads the succeeding frame from the ring buffer memory, encodes the read frame to a sharp image, and transmits the encoded image to the receiving side in (6). The receiving side receives, decodes, and displays this image, so that the succeeding sharp image can be viewed.

When the above described process is performed for "N" consecutive frames, and the request to verify the details of the subject, which is issued by the user on the receiving side, is satisfied, the transmission state is restored to the normal state as shown by the above described sequence.

Explained here is the preferred embodiment where "N" consecutive frames are sequentially displayed on the monitor. However, the details of a subject may be observed by storing "N" consecutive frames in a memory, by reading the frames from the memory later, and by displaying the frames.

FIG. 21 shows the sequence for requesting the transmitting side to temporarily store several scenes.

In a normal state, the transmitting side encodes and transmits normal frames (quasi-moving image). At the same time, the transmitting side stores frames that are not encoded in the ring buffer memory on the transmitting side in (1). The receiving side receives the quasi-moving image transmitted from the transmitting side, decodes the received image, and displays the decoded image on the monitor in (7). Exemplified here is the state where a waterdrop is displayed. Suppose that a request to temporarily store the subject that the user on the receiving side is currently observing in the memory on the transmitting side (the buffer memory 6 for temporary storage in FIG. 4) arises at this time. The receiving side issues the temporary storage request to the transmitting side with a particular operation such as clicking on a screen, etc. The transmitting side that receives the temporary storage request stores the specified single frame in the buffer memory for temporary storage unchanged from an uncompressed state. The normal frame transmission is continued, and also frames that are not encoded are continuously stored in the ring buffer memory in (2). At this time, the receiving side stores the quasi-moving image in the frame requested to be temporarily stored in the memory (the buffer memory 7 for thumbnails in FIG. 4), by putting the image into a thumbnail, while continuing the display of the quasi-moving image transmitted from the transmitting side.

Assume that the request to temporarily store the frame of another subject in the memory on the transmitting side again arises while the receiving side is observing normal frames (quasi-moving image) transmitted by the transmitting side in (3). In this figure, a circular meter is displayed. As described above, in this case, the receiving side specifies a frame and issues the temporary storage request to the transmitting side in (9). The transmitting side that receives this request stores the specified single frame in the buffer memory for temporary storage unchanged from an uncompressed state. The transmitting side continues to transmit the quasi-moving image, and stores frames that are not encoded in the ring buffer memory in (4). In the meantime, the receiving side puts the specified image frame (quasi-moving image) into a thumbnail, and stores the thumbnail in the buffer memory for thumbnails.

The transmitting side continues to transmit normal frames (quasi-moving image) in (5). When the request to temporarily store the frame of still another subject (a square meter in FIG. 21) in the memory on the transmitting side arises, the receiving side specifies a particular frame and issues the temporary storage request to the transmitting side in (10). The transmitting side that receives the temporary storage request performs a process similar to that in the above described case in (6). Namely, the transmitting side stores the specified frame in the buffer memory for temporary storage, and continues to transmit the quasi-moving image and to store frames that are not encoded in the ring buffer. At this time, the receiving side puts the quasi-moving image in the specified frame into a thumbnail, and stores the image in the buffer memory for thumbnails.

In this way, the frame specified by the user on the receiving side can be stored in the memory for temporary storage on the transmitting side. The receiving side looks through thumbnails later, and specifies a frame that the receiving side desires to view sharply, and issues the request to transmit the specified frame with a high degree of sharpness to the transmitting side, so that the sharp image corresponding to the quasi-moving image in the frame, which is specified in real time, can be deliberately observed afterward.

FIG. 22 shows the sequence for requesting reproduction of a stored sharp image at arbitrary timing, which relates to the sequence shown in FIG. 21.

This figure shows the sequence for reproducing the frame stored in the buffer memory for temporary storage in FIG. 21. For example, when a person who patrols a factory, etc., carries a portable video camera, and transmits the image captured by the portable video camera to a control room, the control room temporarily stores the image captured during the patrol, views a thumbnail display, selects the image desired to be again verified, and makes the selected image sharply visible after completion of the patrol.

In a normal state, the transmitting side encodes normal frames (quasi-moving image), and transmits the encoded frames to the receiving side. At the same time, the transmitting side stores frames that are not encoded in the ring buffer memory in (1). The receiving side decodes and displays this quasi-moving image. When the user on the receiving side desires to reproduce and verify a temporarily stored image after completion of the patrol, the receiving side issues a request to sharply reproduce a stored image. At this time, the last normal frame is frozen and displayed in (11). The transmitting side that receives this request suspends an image input and encoding in (2). Then, the receiving side issues a request to sharply reproduce a single stored image frame to the transmitting side. The transmitting side that receives this request starts encoding in (3). The transmitting side then reads the specified single frame from the buffer memory for temporary storage, encodes the read frame to a sharp image, transmits the encoded image, and suspends the encoding in (4). The receiving side decodes the sharp image transmitted in such a way, and displays the decoded image on the monitor.

When the receiving side desires to view the succeedingly stored frame, it issues a request to sharply reproduce the succeedingly stored image frame to the transmitting side. The transmitting side that receives this request starts encoding in (5), reads the succeeding frame from the buffer memory for temporary storage, encodes the read frame to a sharp image, transmits the encoded image to the receiving side, and suspends the encoding in (6). The receiving side receives, decodes, and displays the sharply reproduced image.

Furthermore, when the receiving side issues the request to sharply reproduce the succeedingly stored image frame to the transmitting side in (14), the transmitting side starts encoding in (7), reads the succeeding frame from the buffer memory for temporary storage, encodes the read frame to a sharp image, and transmits the encoded image to the receiving side in (8).

In this way, it is possible to make the transmitting side retransmit a sharp image of a frame stored in the buffer memory for temporary storage. When the request to reproduce and verify a temporarily stored image is satisfied on the receiving side, the transmission state is restored to the normal state in a similar manner as in the above described preferred embodiment.

According to the present invention, it is possible to transmit the image captured by a portable camera, etc., to a center, etc. even through a communications line in a narrow-band through which an image cannot be transmitted with a high resolution, and to verify a desired sharp image on demand on the center side.

What is claimed is:

1. An image on-demand transmitting device performing an image transmission by an on-demand request issued from a receiving side, comprising:
    a unit obtaining an image;
    a buffer memory unit temporarily storing the image with a full quality and a full frame rate obtained by said image obtaining unit;
    a quasi-moving image transmitting unit transmitting a quasi-moving image acquired by degrading a quality and a frame transmission rate of the image obtained by said image obtaining unit; and
    a transmitting unit performing a predetermined process for an image read from said buffer memory unit, and for transmitting the image to the receiving side upon a request issued from the receiving side so that the receiving side displays the quasi-moving image with the quality and the frame transmission rate of the image transmitted.

2. The image on-demand transmitting device according to claim 1, wherein
    said transmitting unit reads a particular single image frame from said buffer memory unit, encodes the read frame to a sharp image, and transmits the encoded image to the receiving side.

3. The image on-demand transmitting device according to claim 1, wherein
    said transmitting unit reads a particular single image frame from said buffer memory unit, encodes the read frame to a sharp image, and transmits the encoded image to the receiving side, and at the same time, said transmitting unit sequentially reads a succeeding or preceding image frame, which is stored in said buffer memory unit, encodes the read frame to a sharp image, and transmits the encoded image to the receiving side.

4. The image on-demand transmitting device according to claim 1, wherein
    said transmitting unit reads a plurality of particular image frames from said buffer memory unit, generates a single image frame by reducing and synthesizing the plurality of particular image frames, encodes the generated frame to a sharp image, and transmits the encoded image to the receiving side.

5. The image on-demand transmitting device according to claim 1, wherein
    said transmitting unit encodes to a sharp image only an image that is partially extracted from an image frame read from said buffer memory unit, and transmits the encoded image to the receiving side.

6. The image on-demand transmitting device according to claim 5, wherein
    which portion to be extracted from the image frame read from said buffer memory unit is determined by selecting a predetermined extraction pattern on the receiving side.

7. The image on-demand transmitting device according to claim 1, wherein
    serial numbers are assigned to respective image frames of the quasi-moving image, and a serial number is specified with a predetermined method on the receiving side, so that a transmission request is issued to said transmitting unit.

8. An image on-demand transmitting device performing an image transmission by an on-demand request issued from a receiving side, comprising:
    an image obtaining unit obtaining an image;
    a first buffer memory unit temporarily storing the image with a fill quality and a full frame rate obtained by said image obtaining unit;
    a second buffer memory unit reading the image stored in said first buffer memory unit and for storing the read image with a full quality and a full frame rate, by a request issued from the receiving side;
    a quasi-moving image transmitting unit transmitting a quasi-moving image acquired by degrading a quality and a frame transmission rate of the image obtained by said image obtaining unit; and
    a controlling/transmitting unit making said second buffer memory unit store the image read from said first buffer memory unit by an on-demand request issued from the receiving side, and for performing a predetermined process for an image read from said second buffer memory unit, and transmitting the image to the receiving side by a request issued from the receiving side so that the receiving side displays the quasi-moving image with the quality and the frame transmission rate of the image transmitted.

9. The image on-demand transmitting device according to claim 8, wherein
    said controlling/transmitting unit reads a particular single image frame from said second buffer memory unit, encodes the read frame to a sharp image, and transmits the encoded image to the receiving side.

10. The image on-demand transmitting device according to claim 8, wherein
    said controlling/transmitting unit reads a particular single image frame from said second buffer memory unit, encodes the read frame to a sharp image, and transmits the encoded image to the receiving side, and at the same time, said controlling/transmitting unit sequentially reads a succeeding or preceding image frame, which is stored in said second buffer memory unit, encodes the read frame to a sharp image, and transmits the encoded image to the receiving side.

11. The image on-demand transmitting device according to 9 or 10, further comprising
a thumbnail buffer memory unit putting into a thumbnail a quasi-moving image frame when a temporary storage request is issued from the receiving side to said second buffer memory unit, and for storing the thumbnail, wherein
the receiving side identifies an image frame stored in said second buffer memory unit by specifying a thumbnail stored in said thumbnail buffer memory unit.

12. The image on-demand transmitting device according to claim 8, wherein
said controlling/transmitting unit reads a plurality of particular image frames from said second buffer memory unit, generates a single image frame by reducing and synthesizing the plurality of particular image frames, encodes the generated image frame to a sharp image, and transmits the encoded image to the receiving side.

13. An image on-demand transmitting method performing an image transmission by an on-demand request issued from a receiving side, comprising:
(a) obtaining an image;
(b) temporarily storing the image with a full quality and a full frame rate obtained in the step (a);
(c) transmitting a quasi-moving image acquired by degrading a quality and a frame transmission rate of the image obtained in the step (a); and
(d) performing a predetermined process for an image stored in the step (b), and transmitting the image to the receiving side, by an on-demand request issued from the receiving side so that the receiving side displays the quasi-moving image with the quality and the frame transmission rate of the image transmitted.

14. The image on-demand transmitting method according to claim 13, wherein
the step (b) reads a particular single image frame from the image stored in the step (b), encodes the read frame to a sharp image, and transmits the encoded image to the receiving side.

15. The image on-demand transmitting method according to claim 13, wherein
the step (d) reads a particular single image fame from the image stored in the step (b), encodes the read frame to a sharp image, and transmits the encoded image to the receiving side, and at the same time, the step (d) sequentially reads a succeeding or preceding image frame, which is stored in the step (b), encodes the read frame to a sharp image, and transmits the encoded image to the receiving side.

16. The image on-demand transmitting method according to claim 13, wherein
the step (d) reads a plurality of particular image frames from the image stored in the step (b), generates a single image frame by reducing and synthesizing the plurality of particular image frames, encodes the generated image frame to a sharp image, and transmits the encoded image to the receiving side.

17. The image on-demand transmitting method according to claim 13, wherein
the step (d) encodes to a sharp image only an image that is partially extracted from the image frame read from the image stored in the step (b), and transmits the encoded image to the receiving side.

18. The image on-demand transmitting method according to claim 17, wherein
which portion to be extracted from the image frame read from the image stored in the step (b) is determined by selecting a predetermined extraction pattern on the receiving side.

19. The image on-demand transmitting device according to claim 13, wherein
serial numbers are assigned to respective image frames of the quasi-moving image, and a serial number is specified with a predetermined method on the receiving side, so that a transmission request is issued in the step (d).

20. An image on-demand transmitting method performing an image transmission by an on-demand request issued from a receiving side, comprising:
(a) obtaining an image;
(b) temporarily storing the image with a full quality and a full frame rate obtained in the step (a);
(c) reading the image stored in the step (b) and storing the read image, by a request issued from the receiving side;
(d) transmitting a quasi-moving image acquired by degrading a quality and a frame transmission rate of the image obtained in the step (a); and
(e) storing in the step (c) an image read from the image stored in the step (b) by an on-demand request issued from the receiving side, and performing a predetermined process for an image read from the image stored in the step (c) and transmitting the image to the receiving side by a request issued from the receiving side so that the receiving side displays the quasi-moving image with the quality and the frame transmission rate of the image transmitted.

21. The image on-demand transmitting method according to claim 20, wherein
the step (e) reads a particular single image frame from the image stored in the step (c), encodes the read frame to a sharp image, and transmits the encoded image to the receiving side.

22. The image on-demand transmitting method according to claim 20, wherein
the step (e) reads a particular single image frame from the image stored in the step (c), encodes the read frame to a sharp image, and transmits the encoded image to the receiving side, and at the same time, the step (e) sequentially reads a succeeding or preceding image frame, which is stored in the step (c), encodes the read fame to a sharp image, and transmits the encoded image to the receiving side.

23. The image on-demand transmitting method according to 21 or 22, further comprising:
(f) putting into a thumbnail a quasi-moving image frame when a temporary storage request in the step (c) is issued from the receiving side, and storing the thumbnail, wherein
the receiving side identifies an image frame stored in the step (c) by specifying a thumbnail stored in the step (f).

24. The image on-demand transmitting method according to claim 20, wherein
the step (e) reads a plurality of particular image frames from the image stored in the step (b), generates a single image frame by reducing and synthesizing the plurality of particular image frames, encodes the generated image frame to a sharp image, and transmits the encoded image to the receiving side.

\* \* \* \* \*